Dec. 18, 1962 S. D. NOBLE 3,069,510

SOUND RECORDING AND REPRODUCING APPARATUS

Filed July 21, 1958 11 Sheets-Sheet 1

STUART D. NOBLE.
INVENTOR.

BY Vernon D. Beehler

ATTORNEY.

SOUND RECORDING AND REPRODUCING APPARATUS

Filed July 21, 1958 11 Sheets-Sheet 2

INVENTOR:
STUART D. NOBLE.

BY Vernon D. Beehler

ATTORNEY.

Dec. 18, 1962 S. D. NOBLE 3,069,510

SOUND RECORDING AND REPRODUCING APPARATUS

Filed July 21, 1958 11 Sheets-Sheet 3

STUART D. NOBLE,
INVENTOR.

BY Vernon D. Beehler

ATTORNEY.

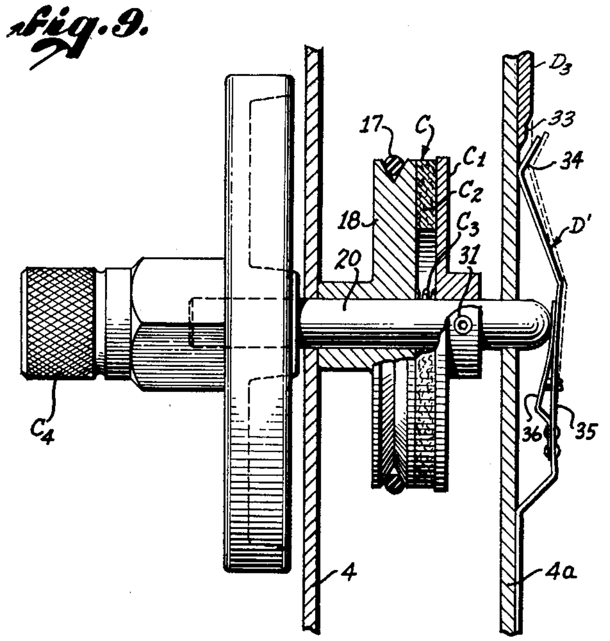
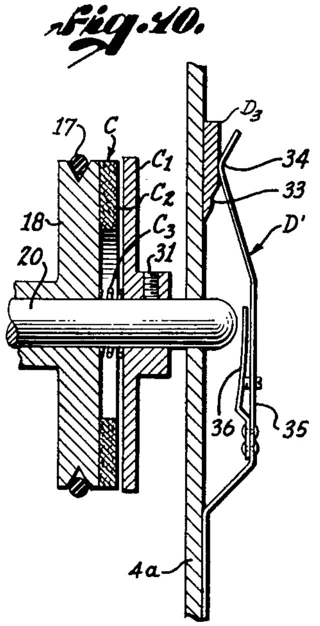
Fig. 11. Fig. 12.
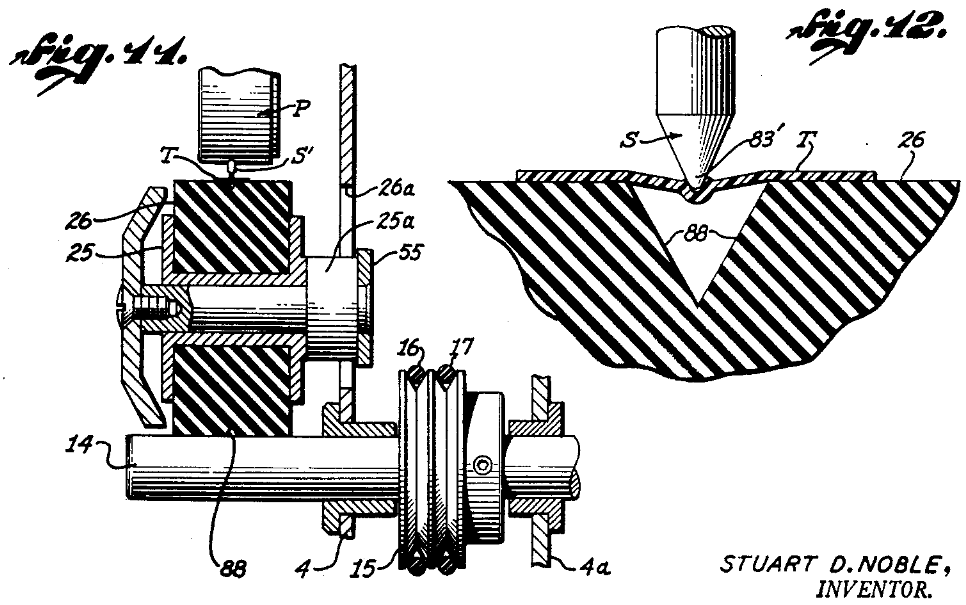
STUART D. NOBLE,
INVENTOR.
BY Vernon D. Beehler
ATTORNEY.

SOUND RECORDING AND REPRODUCING APPARATUS

Filed July 21, 1958

STUART D. NOBLE.
INVENTOR.

BY Vernon D. Beehler

ATTORNEY.

STUART D. NOBLE,
INVENTOR.

BY Vernon D. Beehler

ATTORNEY.

Dec. 18, 1962 S. D. NOBLE 3,069,510

SOUND RECORDING AND REPRODUCING APPARATUS

Filed July 21, 1958 11 Sheets-Sheet 7

STUART D. NOBLE.
INVENTOR.

BY Vernon D. Beehler

ATTORNEY.

STUART D. NOBLE,
INVENTOR.

BY Vernon D. Beehler
ATTORNEY

RECORD-MIKE

RECORD-RADIO. TELEVISION
OR PHONOGRAPH

RECORD-DUB

PLAY BACK

STUART D. NOBLE,
INVENTOR.

BY Vernon D. Beehler

ATTORNEY.

STUART D. NOBLE
INVENTOR.
BY Beehler & Shanahan
ATTORNEYS.

Dec. 18, 1962 S. D. NOBLE 3,069,510

SOUND RECORDING AND REPRODUCING APPARATUS

Filed July 21, 1958 11 Sheets-Sheet 11

STUART D. NOBLE
INVENTOR.

BY Beehler & Shanahan

ATTORNEYS.

3,069,510

SOUND RECORDING AND REPRODUCING APPARATUS

Stuart D. Noble, Los Angeles, Calif., assignor of ten per-cent to Vernon D. Beehler, Los Angeles, Calif.

Filed July 21, 1958, Ser. No. 749,903
35 Claims. (Cl. 179—100.4)

This invention relates in general to sound recording and reproducing apparatus but more specifically to and has for an object the provision of an improved means and method for recording sound impulses on extremely narrow plastic tape by deforming the tape by application of a stylus thereto which in response to sound vibrations will indent an obverse surface of the tape and correspondingly emboss the reverse side of the tape to form an irregular longitudinal groove and sound track in the sides of which, due to lateral vibration of the stylus, indentations representative of variations in sound will be made by deformation of, instead of cutting, the record tape, whereby in spite of the narrowness of the tape, a plurality of substantially parallel sound records of different subjects or consecutive sections of a single subject may be made on a single strip of tape and any or all sections of a record may be made for ready and selective reproduction and of a length equal to or even exceeding that of sound records otherwise produced, at a cost far less, and a recording and reproducing unit of much smaller size than other types of tape machines provide.

This is a continuation-in-part of my co-pending application Serial No. 414,044, filed March 4, 1954, now abandoned.

It is therefore among the objects of the invention to provide a unit of the type and for the aforesaid purpose including means under control of an operator for selectively shifting the tape relative to the stylus, or vice versa, whereby to transfer the stylus from one to another sound track or section thereof in a reproduction operation or to a position for forming a record groove parallel to another or others in a recording operation so as to change a playing record at will or continue a playing record beyond the extent of one groove section or track.

Another object is to provide a simple driving mechanism with suitable guides including a pay-out reel and a take-up reel, for moving the narrow strip of deformable virgin plastic tape under or adjacent a recording stylus for rewinding on the take-up reel without other than its inherent tension and by reversal of its direction from its then pay-out reel, moving the tape under or adjacent the stylus and onto the then take-up reel for reproducing the sound recorded on the tape.

A further object is to provide a suitable amplifier and "speaker" operatively connected with the recording and playing heads and incorporating an electric circuit which includes electrical and electronic elements necessary to proper operation of the combined recording and reproducing unit and which are specially arranged to meet requirement of this unit for its over-all operative function.

It may be understood, moreover, that I am familiar with other well known recording and reproducing units of both magnetic and non-magnetic tape, wire and disc types, with none of which my unit should be confused or compared, particularly because said well known and currently used types of units are not adapted for operation with the special features and characteristics of my improved unit.

It has heretofore been obviously difficult, if not quite impossible, to adapt any particular sound recording system to all demands of use within the range of domestic entertainment, industrial, commercial and scientific purposes. Hence, it is an object to provide a unit of minimum size and low original and maintenance cost, capable of faithful recordation of music, lectures, sermons, dictations, etc., and reproductions thereof when operated by unskilled persons. The recording tape being of minimum thickness—preferably about .0005″ to .003″, and of a width of .093″ (3/32″) more or less—is yet sufficiently wide to receive several parallel sound tracks and the pay-out and take-up reels are of such small diameter—three inches more or less—and yet capable of bearing a continuous strip of tape sufficiently long to allow two to four hours on each reel, that a record of maximum length is afforded, several times the length of the tape.

Sound recording apparatus is subject to faulty recordation and reproduction due to the pick-up by the recording and playing heads of alien sounds generated by the hum of a motor, vibrations and counter-vibrations set up by flimsy or insecure parts, rubbing of the tape over pulleys, sprockets or stationary surfaces, and guides at the edges of the tape, and such sounds are amplified in the unit and materially impair the results. A still further object, therefore, is to so form and arrange the sub-units of my mechanism that all such alien noises will be eliminated. To such end, as one contributing factor, I provide a friction drive mechanism free of gears and susceptibility to conduction or transmission of alien vibrations.

An important object is to provide a recording head capable of certain new and useful modifications of the conventional type of sound groove, and a reproducing head of a new type which is responsible for the satisfactory reproduction of the above-mentioned type of sound groove, said playing head also providing certain other valuable characteristics for the accurate and satisfactory reproduction of the special type of sound groove referred to above, or any other type of laterally undulating sound groove.

Another object of the present invention is to provide more life-like recording and reproduction of sound by elimination of the constant background noise previously common to tape recorders of the sound groove type, said background noise being partially caused by mechanical vibrations and partially caused by friction of the tape itself in passing over stationary members adjacent to the recording and reproducing areas. To this end I have devised a method of tape support and transport which eliminates sliding or rubbing contact near the recording or playing heads so that the tape approaches and leaves this vital area while moving on the periphery of a positively driven roller, the tape being stationary with respect to the surface of this driven roller while passing under the recording and playing heads.

Prior devices of this general type have provided various means for supporting the tape during recording or reproducing, such means being generally stationary guides or platens against which the tape was caused to slide while passing beneath the recording and reproducing styli or rotating rollers across which the tape passed during this phase of its travel. However, the platens or rollers known in prior devices introduced objectionable background noise, in the form of rumble or hum for several reasons, this noise component being imparted to the sound groove during recordation. Those platens or rollers which were of a hard and unyielding substance transmitted mechanical noise to the tape from the motor or other mechanism of the machine. In an effort to avoid this objectionable transmission of extraneous sound, various types of relief grooves or channels were provided directly beneath the recording and reproducing styli. This only partially solved the problem since the frictional sound of the tape sliding across a stationary platen continued to create objectionable noise. In the case of wheels or rollers for supporting the tape at the time of recording and reproducing, their hardness continued to allow transmission of alien sounds from the mechanism to the tape. In those devices which utilized a resilient supporting member for the tape during recording and reproducing, some used a felt pad which resulted in a frictional noise; others used a roller covered with rubber. This latter was only suitable for use with tape of very great thickness. Under conditions where a thin tape is recorded directly against a rubber-like surface, the sound groove is modified by the structure of the rubber so that an additional rumble or random noise effect is imparted to the sound groove at the instant of formation, whether cut or indented.

Therefore, an important object of my invention is to provide a rotating tape support member having a resilient periphery in which a deep relief groove is formed, said groove being positioned directly below the center line of the recording and reproducing styli and being several times as wide as the mean width of the sound groove, though relatively much less wide than the total width of the tape. The manner in which the tape is fed to this supporting or recording roller insures the tape adhering firmly to the surface of said roller while passing under the styli since the tape is held in a slight tension throughout its travel from one reel to the other and is positioned on the support roller for more than half its circumference. While passing around the supporting roller the tape, due to its intimate tension contact with the resilient surface of the roller, is prevented from being laterally displaced by the movements of the recording stylus. Also, the tape is held in a "stretched membrane" state over the relief groove of the roller by virtue of the manner in which it is held in intimate contact with the roller under slight tension. As a result, the tape, while firmly supported against lateral shifting on the roller, is vertically unsupported by the roller in the area immediately beneath the styli so that the tape is free to yield vertically to a slight extent. This vertical freedom accomplishes two important things. First, it provides substantial reduction in any residual mechanical noise which may reach the recording roller. Second, it eliminates the pick-up of background noise which would occur if recording of the tape were performed directly against the resilient face of the roller. By this combination of supporting and transporting means, it is thus possible to achieve natural sound recording and reproduction without the introduction of unwanted mechanical or frictional noise.

Prior art discloses at least one mechanism in which a grooved resilient roller has been used in this connection. However, the similarity is only superficial, since the relief groove in that instance was specifically shown to be so shallow as to allow the underside of the tape to contact the bottom of the relief groove during recording and reproducing which would allow pick-up of random noise due to the structure of the resilient material itself as well as some degree of mechanical noise transmission to the tape.

Essentially, therefore, it is an object to provide a combined recording and reproducing unit designed to overcome the difficulties of and objections to prior units for a like purpose particularly with respect to high costs of production and maintenance, excessive size and complicated operational parts, steps and features, and to provide a unit of simplified but refined character arranged for full and complete recordation and reproduction of sound with fidelity and economy capable of use by non-professional operators for entertainment, education and information as well as private and business use.

I have ascertained that utilization of a thin narrow tape operating at a low linear speed effects substantial economy not only in the cost of the tape but also in parts and accessories. The miniature size and light weight of the tape reels when loaded permits the use of a much smaller and less expensive motor than those required for prior or modern magnetic, wire and disc recording units, and the entire unit and its sub-units are correspondingly of reduced size and cost.

While I am aware that such characteristics of themselves are not novel, the particular devices and their interrelationship and cooperation produce substantially improved results over prior and current units with additional benefits and advantages.

It is well known that different types of recording units are required for faithful recordation and reproduction of spoken subject matter and music with equally good effect. Prior attempts to accomplish this result by use of slow speed recording elements have failed and units which have been more or less successful have been necessarily large, heavy and costly as compared with my contemplated unit.

Hence, it is an object to provide a unit whose components are each vital, important, interdependent and cooperative for producing a satisfactory and improved result but also are independently novel and improved over other elements for similar purposes.

Other and more detailed objects will appear as the description progresses.

I have shown a preferred type of recording and reproducing unit embodying my several improvements in the accompanying drawings in which.

Figure 2:
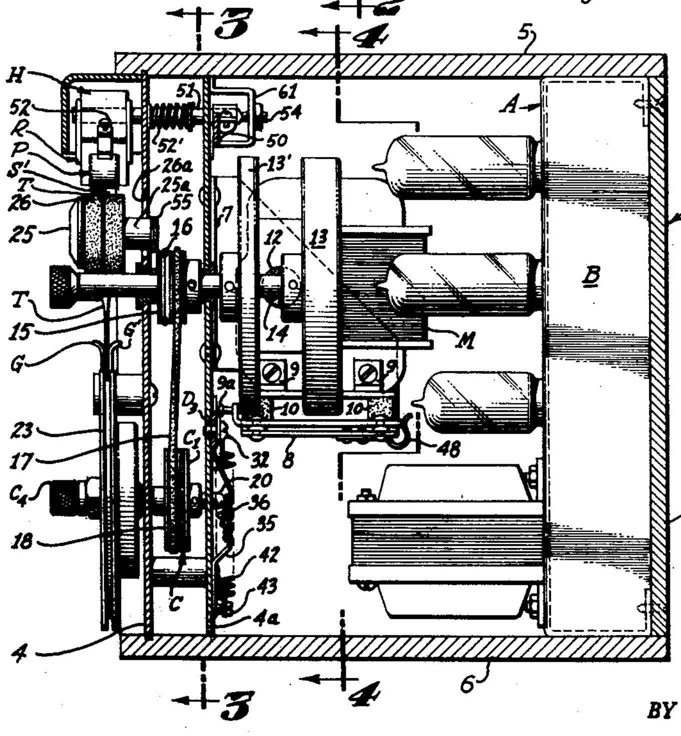
FIGURE 2 is an elevational section as viewed in the plane of line 2—2 of FIGURE 1.
Figure 2A:
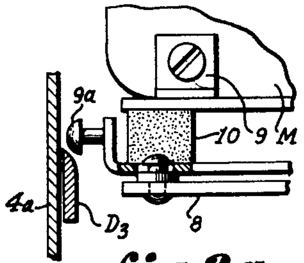

FIGURE 2*a* is an enlarged view of the motor mount.

Figure 3:
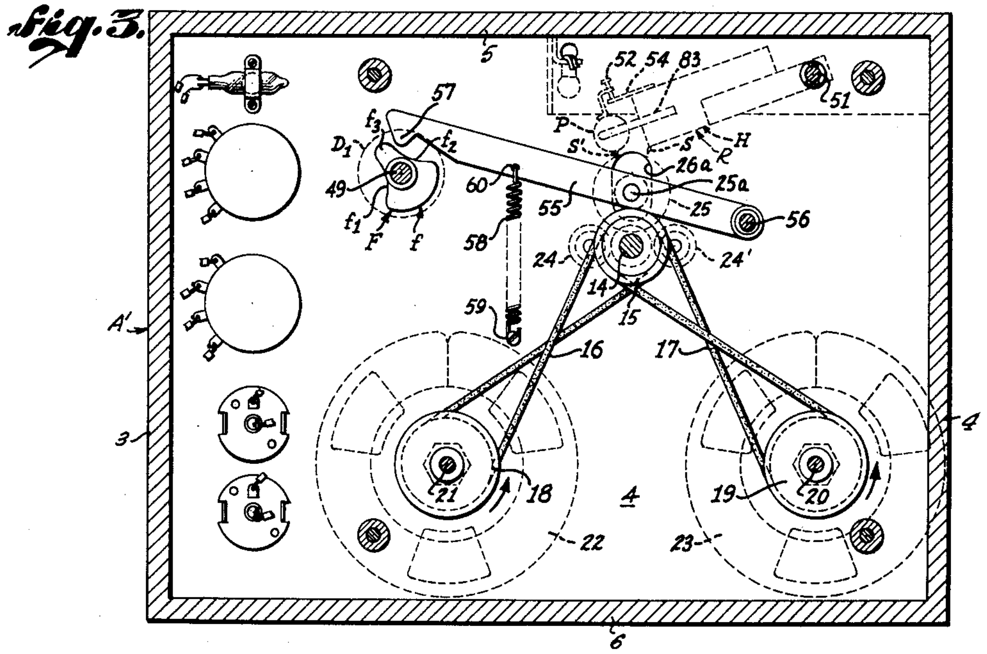

FIGURE 3 is an elevational section on line 3—3 of FIGURE 2.

Figure 4:
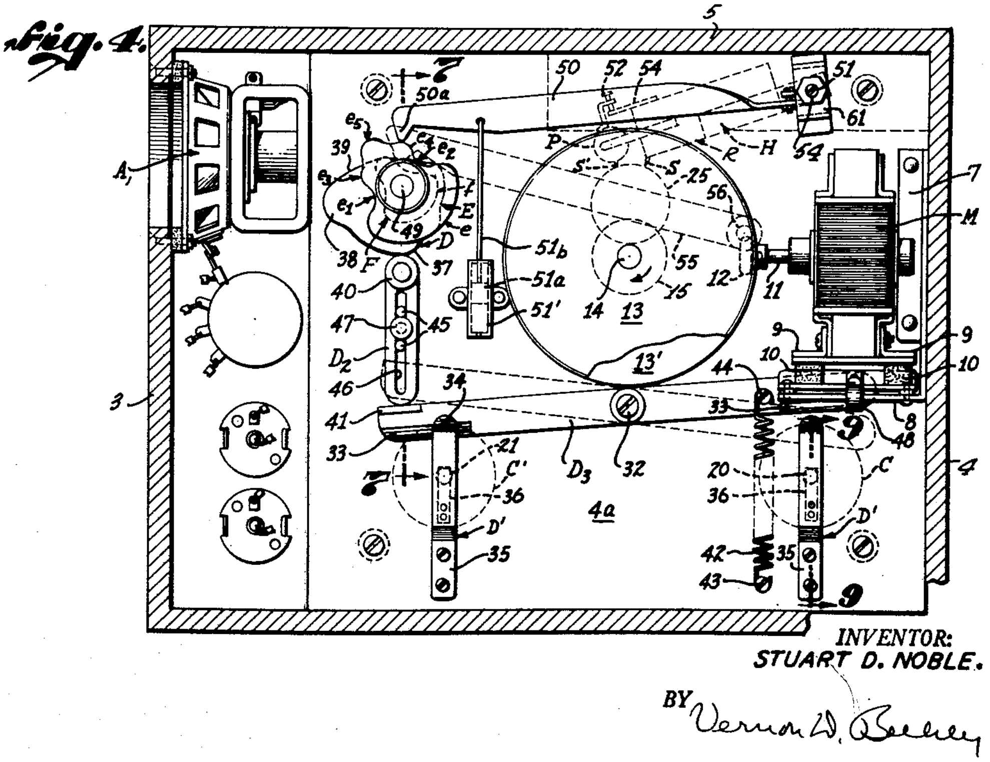

FIGURE 4 is an elevational section on line 4—4 of FIGURE 2.

Figure 1:
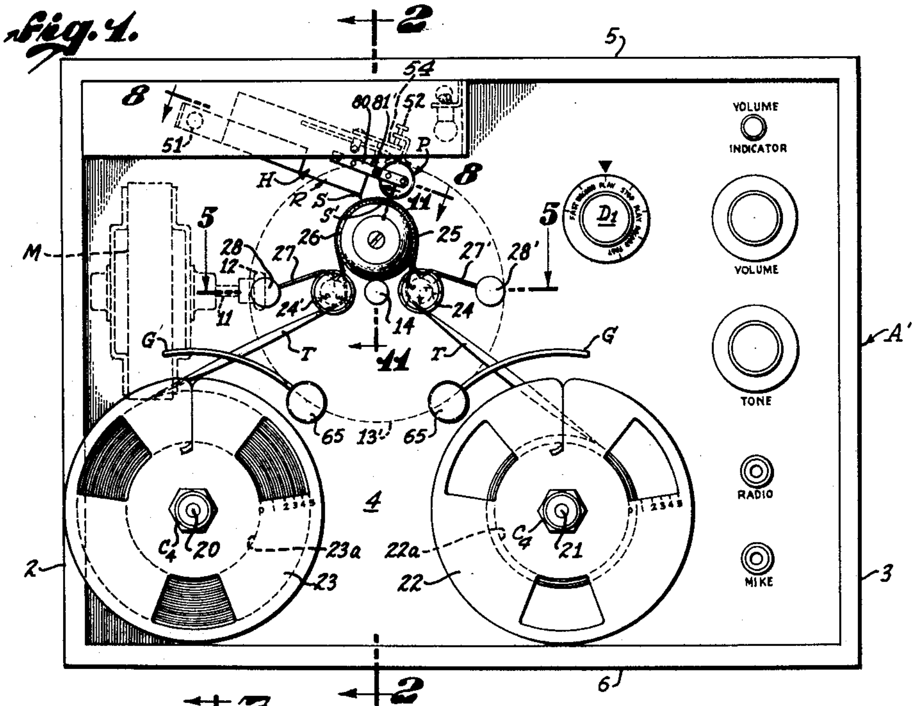
FIGURE 1 is a front elevational view.
Figure 5:
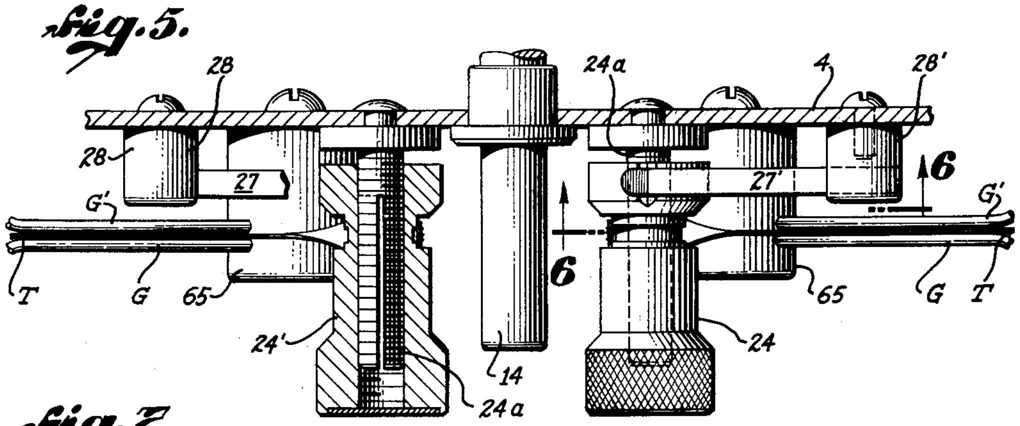

FIGURE 5 is a sectional plan on line 5—5 of FIGURE 1.

Figures 6, 7, 8:
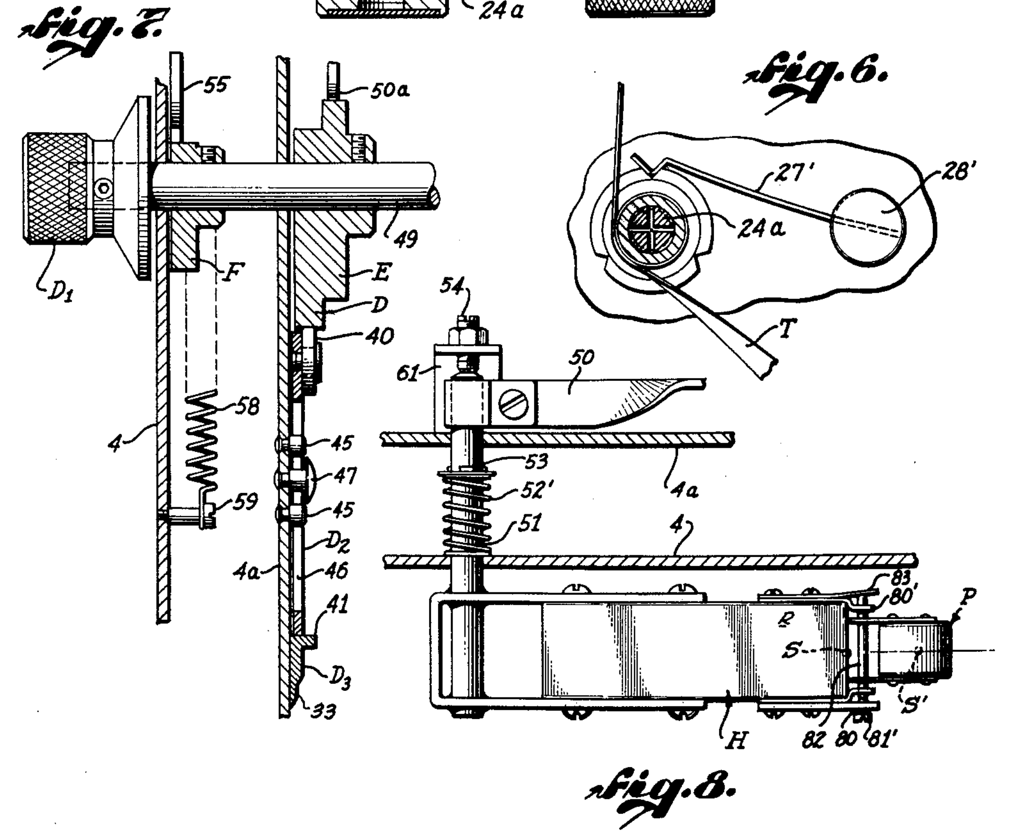

FIGURE 6 is a fragmentary front view on line 6—6 of FIGURE 5.

FIGURE 7 is a fragmentary sectional view on line 7—7 of FIGURE 4.

FIGURE 8 is a plan partly in section on line 8—8 of FIGURE 1.

FIGURES 9 and 10 are sectional views on line 9—9 of FIGURE 4 showing parts of the mechanism in different positions.

FIGURE 11 is a fragmentary sectional view of the recording head and associated parts on line 11—11 of FIGURE 1.

FIGURE 12 is an enlarged sectional view of the recording stylus, tape and roller for moving the tape relative to the stylus corresponding to the illustration of said elements in FIGURE 11.

Figure 13:
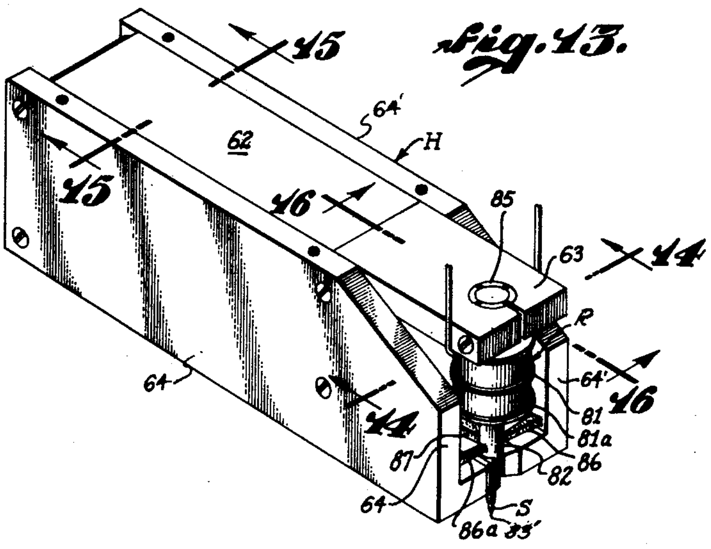

FIGURE 13 is a perspective view of the recording head detached from the unit.

Figures 14, 15, 16, 17, 18:
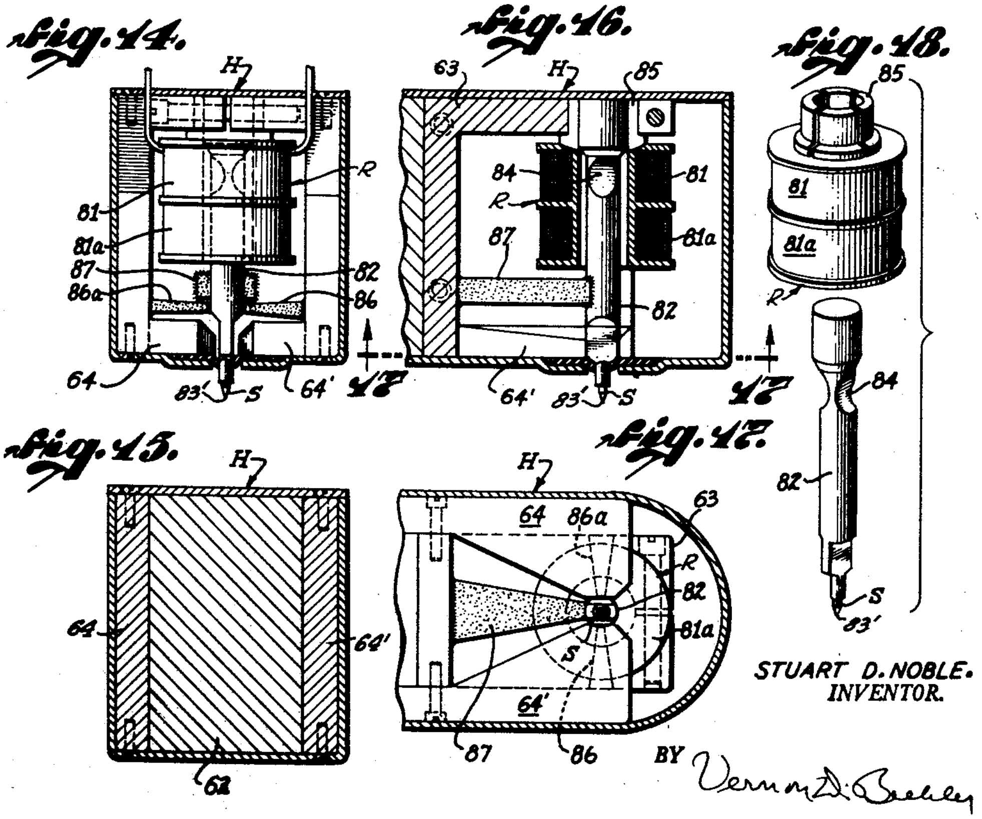

FIGURES 14, 15 and 16 are respectively on lines 14—14, 15—15 and 16—16 of FIGURE 13.

FIGURE 17 is a sectional plan of the recording head on line 17—17 of FIGURE 16.

FIGURE 18 is an exploded view of the stylus and its coil detached from the recording head.

Figure 19:
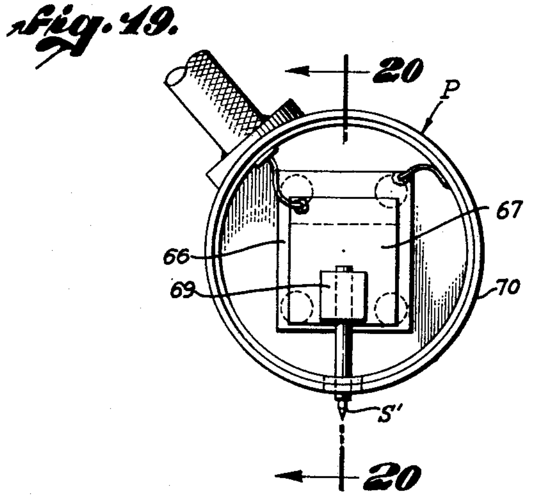

FIGURE 19 is a side view of the playing head.

Figure 20:
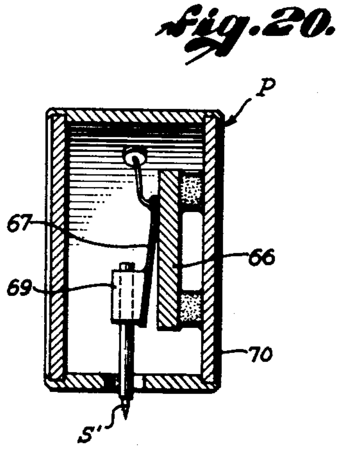

FIGURE 20 is a sectional view of the playing head on line 20—20 of FIGURE 19.

Figure 21:
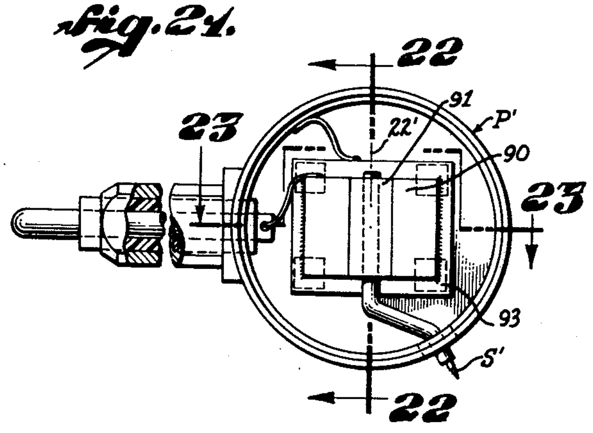

FIGURE 21 is a side view of a modified form of playing head.

Figure 22:
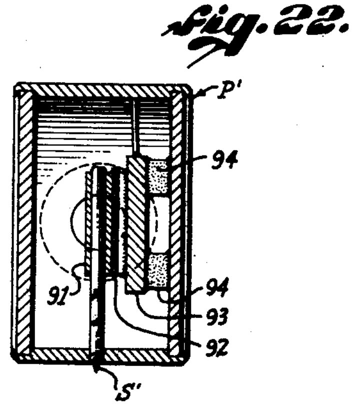

FIGURE 22 is a sectional view of the same on line 22—22 of FIGURE 21.

Figure 23:
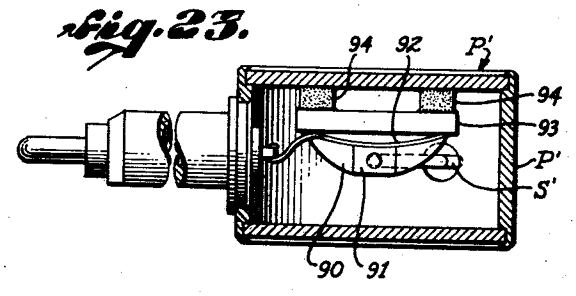

FIGURE 23 is a sectional view of the same on line 23—23 of FIGURE 21.

Figure 24:
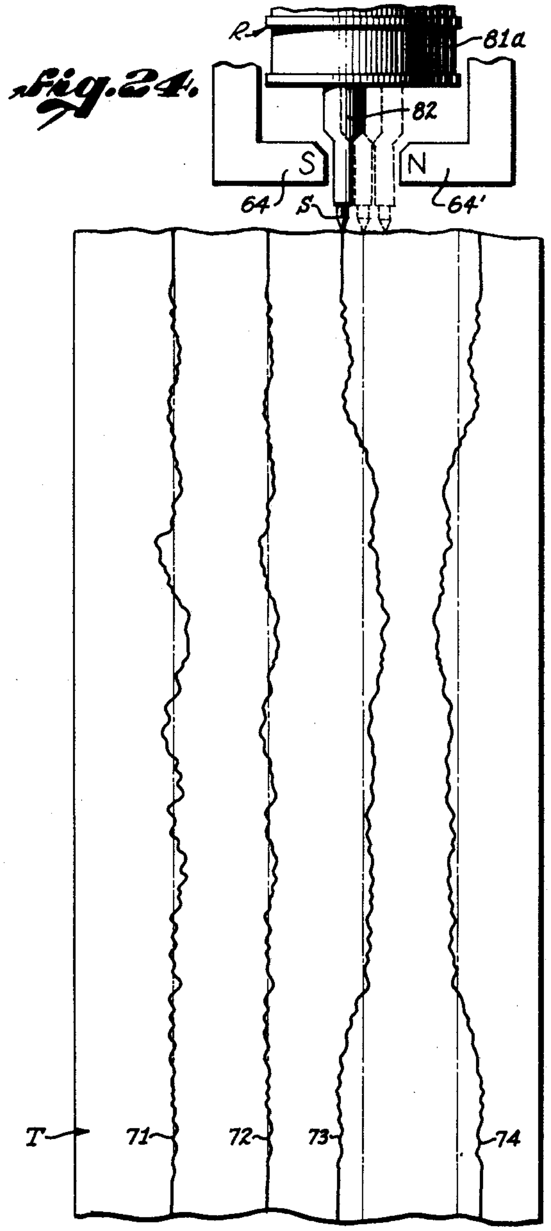

FIGURE 24 is a face view of a fragment of tape showing four types of sound track thereon.

Figure 25:
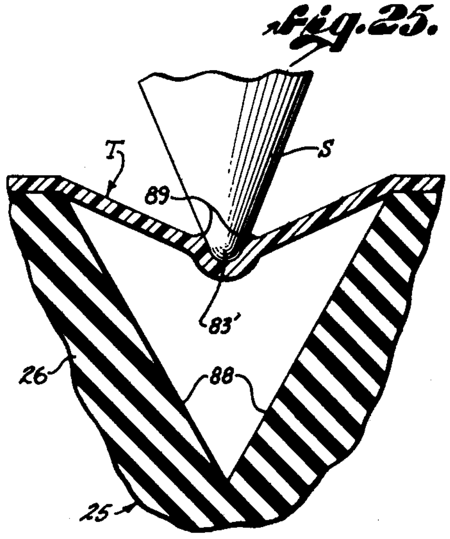

FIGURE 25 is an enlarged view of the recording stylus in position on a tape in registration with the forming groove of a fragment of the tape driving roller.

Figure 26:
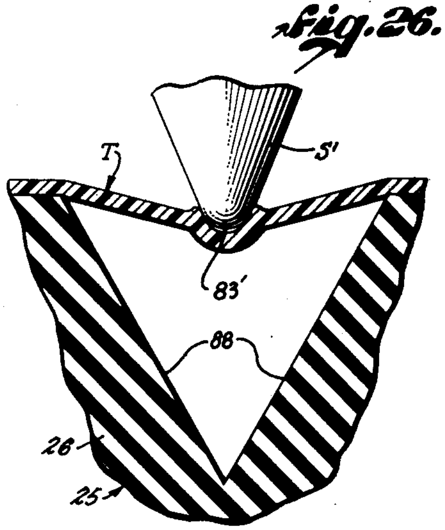

FIGURE 26 is a view similar to FIGURE 25 except that it shows a playing head stylus instead of a recording stylus.

Figure 27:
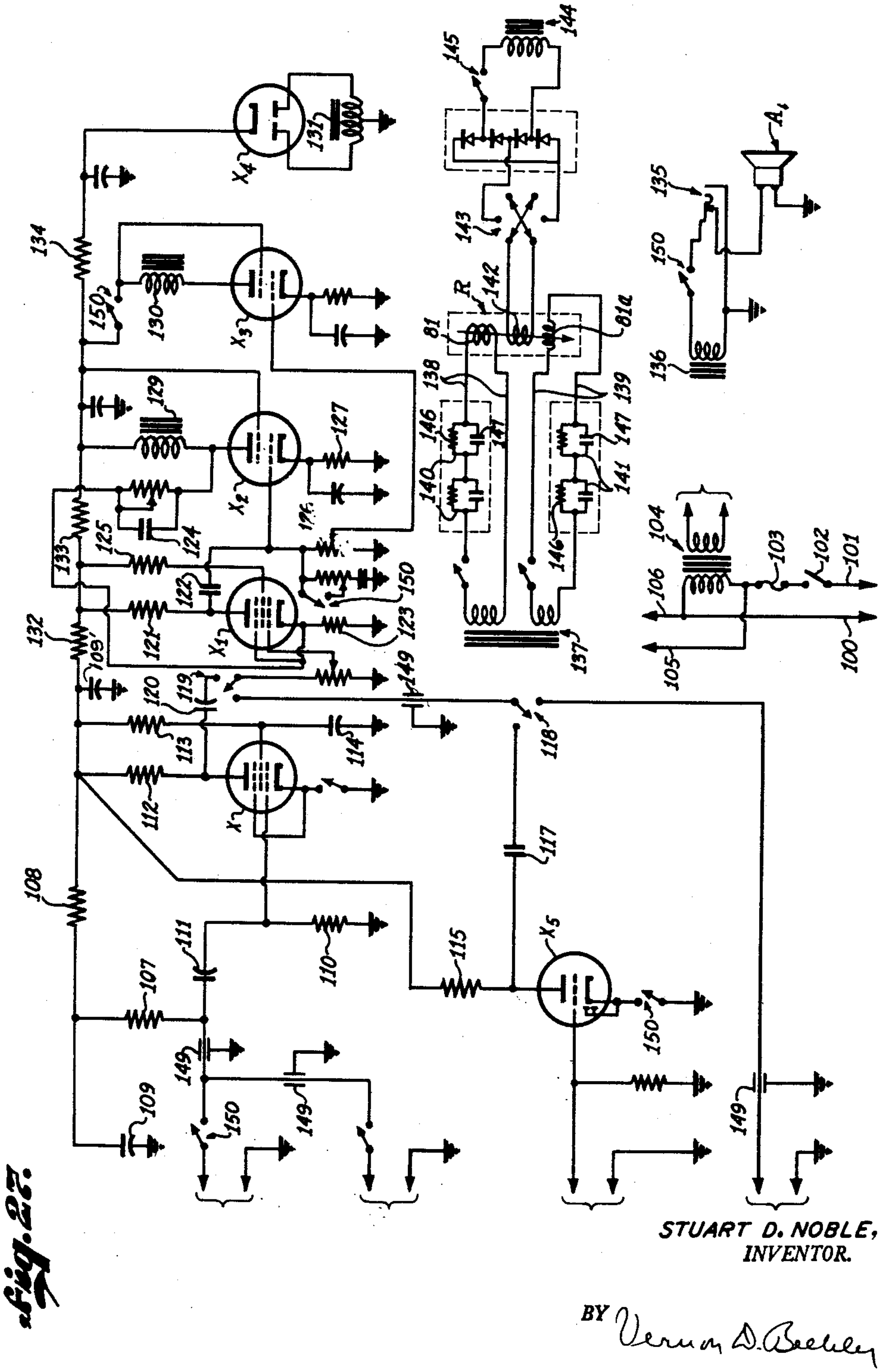
Figure 28:
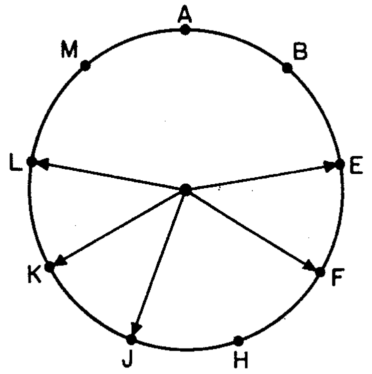
Figure 29:
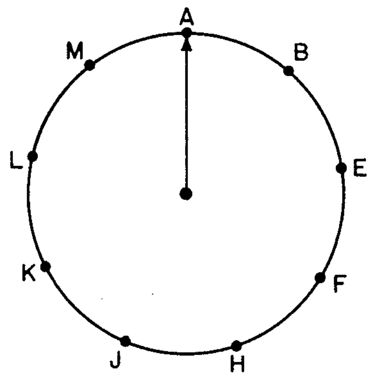
Figure 30:
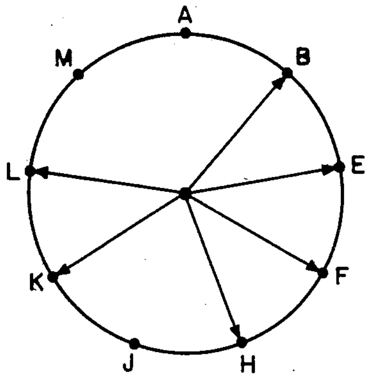
Figure 31:
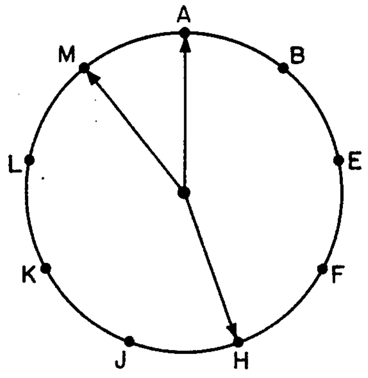

FIGURE 27 shows a circuit diagram typical of a unit embodying the features of my invention;

FIGURES 28, 29, 30 and 31 are schematic electrical diagrams of the controls for switching to different selected positions necessary to adjust the amplifier for its various functions.

Figure 32:
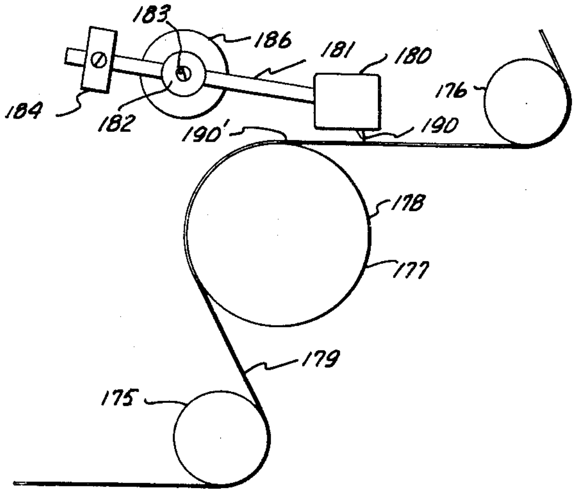

FIGURE 32 is a schematic representation of the tape transport mechanism showing a modified form of relationship of the sound head with respect to the tape.

Figure 33:
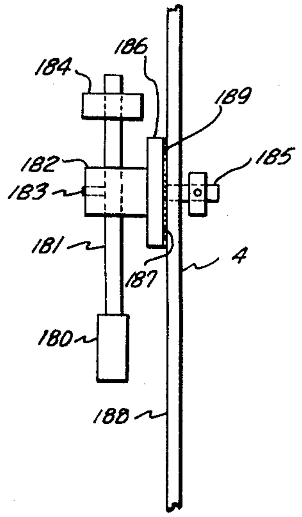

FIGURE 33 is a plan view of the device illustrated in FIGURE 32.

Figure 34:
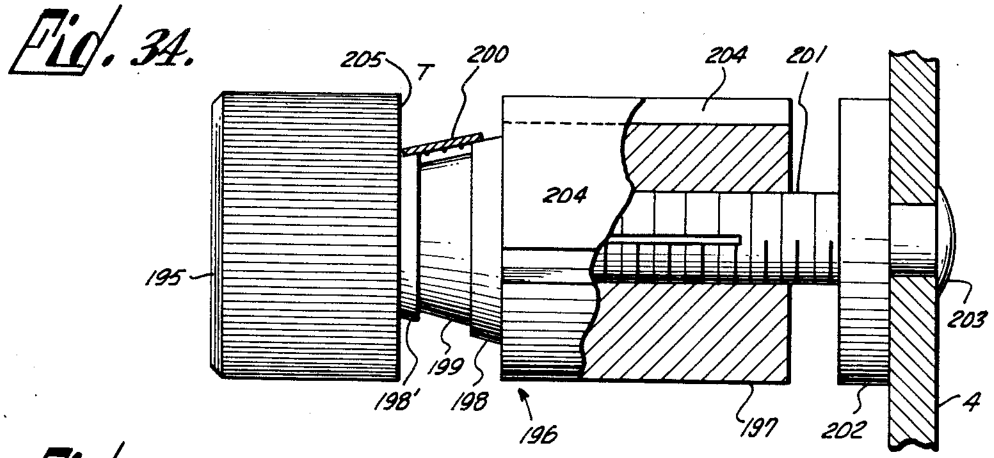

FIGURE 34 is an elevational view partially broken away showing an alternative form of tape guide.

Figure 35:
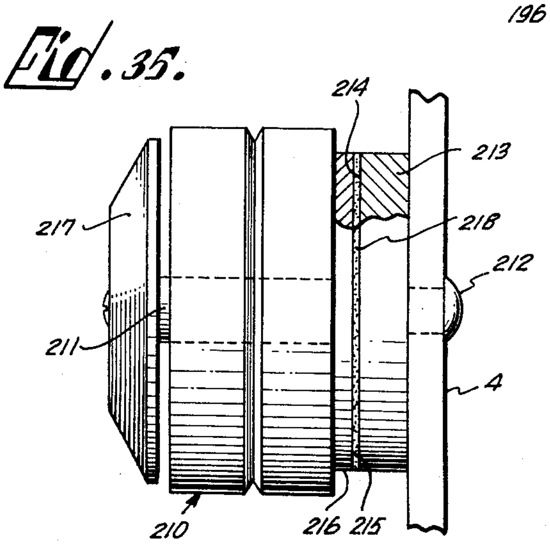

FIGURE 35 is an elevational view partially broken away showing an alternative mounting for the tape drive roller similar to that illustrated in FIGURE 11.

Figures 36, 37A:
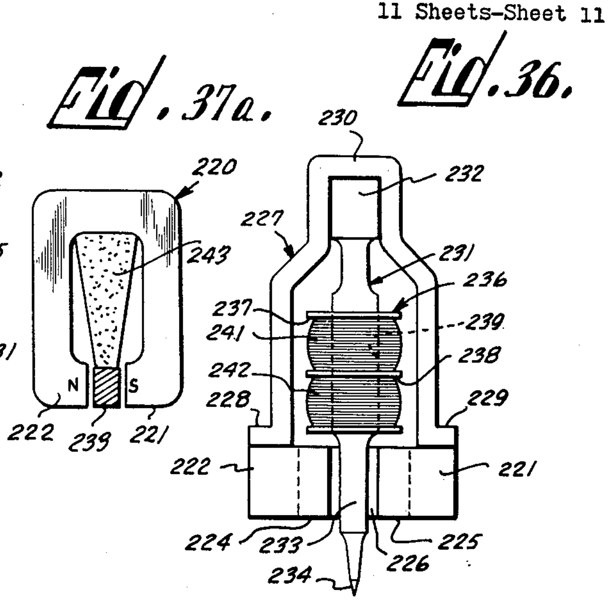

FIGURE 36 is a front elevational view of an alternative form of the recording head.

Figure 37:
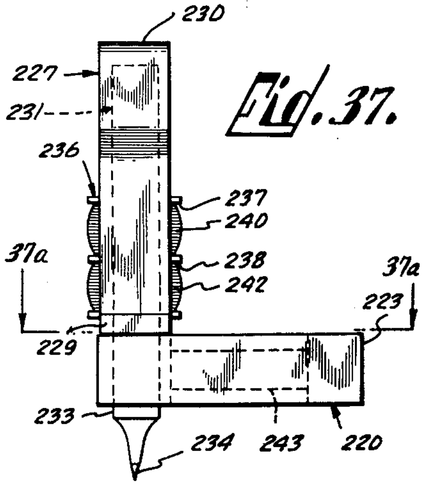

FIGURE 37 is a side elevational view of the alternative form of recording head shown in FIGURE 36.

FIGURE 37*a* is a cross-sectional view on the line 37*a*—37*a* of FIGURE 37.

Figure 38:
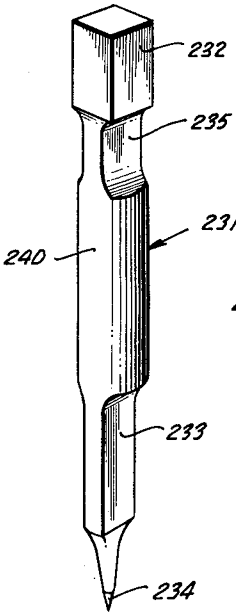

FIGURE 38 is a perspective view of a stylus armature used in the type of recording head shown in FIGURES 36 and 37.

Figure 39:
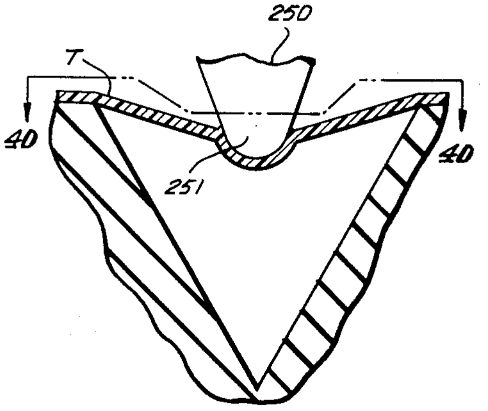

FIGURE 39 is a fragmentary cross-sectional view of a portion of the tape drive roller illustrating a modified form of stylus.

Figure 40:
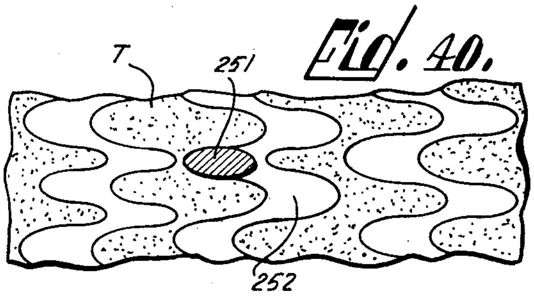

FIGURE 40 is a view taken on the line 40—40 of FIGURE 39.

All of the elements of an assembled unit are compactly, conveniently and accessibly mounted on and in a suitable case A' including a rear wall 1, ends 2 and 3, a front panel 4 on which the controls are mounted, a top 5 and bottom 6, all or any of which may be detachable at will. A base B for a chassis and on which various requisite electrical and electronic units are mounted is suitably supported in the case on the rear wall 1 as shown or otherwise so that the chassis may be readily accessible for any purpose.

As shown best in FIGURE 4, a motor M is supported on a wall of case A by means of an angle bracket 7 on which is a right angularly bent foot 8. Between the right angularly bent foot 8 and feet 9, 9 of the motor frame are cushions 10, 10 for the purpose of dampening vibrations set up by the motor. A spindle 11 on the motor carries a frictional driving wheel 12 which drivingly engages a fly wheel 13 borne by a driven shaft 14. On the reverse side of panel 4 a pulley 15 is fixed to shaft 14 and is drivingly connected by belts 16 and 17 with pulleys 18 and 19, respectively, on shafts 20 and 21 in such a manner that pulleys 18 and 19 will drive the associated reels 22 and 23, respectively, when either of said reels function as a pay-out reel while the other reel is a take-up reel.

Shafts 20 and 21 carry similar reels 22 and 23 outwardly of front panel 4 for respectively paying out and taking up a tape strip T, the end portions of which run over grooved guides 24 and 24' mounted on split threaded shafts **24*a*, and thence loop over a roller 25 having a resilient periphery 26, said roller being driven by contact with the projecting portion of shaft 14 (see FIGURE 1). Thus, the tape T is withdrawn from the pay-out reel by the action of roller 25, and after leaving roller 25 is wound onto the take-up reel by the slip-friction action of the take-up spindle. In order to prevent spillage of tape from either reel during the various operations of the machine, a pair of narrow V guides G and G' are provided. These guides have two additional functions. By directing the tape sligthly away from its normal center line, they insure its contact with one predetermined side of the guides 24 and 24'. Thus, it is not necessary to attain a high degree of manufacturing accuracy in fabricating the grooved guides 24 and 24', since only one side of the guiding groove is used to position the tape as it is fed onto the recording roller 25. In addition, should the tape itself vary in width, it would normally bind or wander when passing through the guide grooves if these grooves were made to fit a nominal tape width, according to whether the tape happened to be slightly greater or less than its normal width. But being constantly positioned against one predetermined side of the guide groove, the tape will always approach the roller 25** in the same relative position, regardless of variations in the width of the tape.

Because guides G and G' in the form of arms hold the tape in an edgewise rather than a flat position as it approaches or leaves the reels, frictional noise between the tape and reels is eliminated as the tape is wound onto or unwound from either reel.

Guide posts 24 and 24' serve to position the tape laterally as it is fed onto roller 25. Adjustment for the desired groove positions on the tape is accomplished by rotating the appropriate guide as indicated by the index numbers affixed to each, each guide post being threadedly mounted on a stud which is permanently affixed to plate 4. Recording and reproducing may be accomplished in both directions and in either case the guide post which directs the tape just prior to its arrival at roller 25 is the one which controls the tape's lateral position on the roller. Therefore, each guide post controls half the total number of sound groove positions and is numbered accordingly, the desired positions being indexed by the detent springs 27 and 27' which are affixed to plate 4 by means of studs 28 and 28'.

Obviously, the frictional driving means applied to shaft 14 and from said shaft to the tape driving roller 25 obviates the possibility of excessive vibration and resultant alien sounds. Also, the tape T being positively driven by frictional contact with roller 25, instead of being employed to drive a member, relieves the tape of any undue stress or strain which might be otherwise occasioned and result in stretching, deforming or actual breakage of the tape (or speed variations). Similar frictional plate clutches C and C', as shown best in FIGURES 4, 9 and 10, are provided on shafts 20 and 21, respectively, between pulleys 18 and 19 which are loose on said shafts and associated plates $C_1$ in each case which are fixed to said shafts as by means of set screws 31, and an annular friction element $C_2$ is affixed to each pulley 18 adjacent plate $C_1$ for frictionally driving pulleys 18 and 19 and reels 22 and 23 in appropriate directions for unwinding tape T from one reel onto the other reel. A spring $C_3$ on each shaft 20 and 21 is compressed between the pulley and the associated plate $C_1$ for normally providing free rotation of each pulley by manually thrusting shaft 20 or 21 inwardly by pressure upon a knob $C_4$ affixed to the outer end of each shaft 20 or 21. Reels 22 and 23 and knobs $C_4$ are then mounted on the obverse side of panel 4 and clutches C and C' are between said panel and a partition **4*a* spaced rearwardly from the panel (see FIGURES 2, 9 and 10). Shafts 20 and 21 are axially shiftable through panel 4 and partition 4*a* to opposite extreme for engaging and disengaging the clutch elements $C_1$ and $C_2$ in each case under control of a cam D at the rear side of partition 4*a*, a detent D', a cam follower $D_2$ and a rocker bar $D_3$ centrally pivoted at 32 and having terraced bar 33 near each end thereof engageable by end portion 34 of each detent. Each detent has a tensioned flat bar 35 anchored to wall 4*a* at its end opposite from end 34 and a shorter tensioned bar 36 anchored at one end to bar 35 and with its free end disposed opposite the extended rounded end of shaft 20 or 21 as the case may be. Thus, as cam D rotates, different segments 37, 38 and 39 engage the upper end 40 of followed $D_2$ to urge the follower downwardly onto a lug 41 on bar $D_3$ against the tension of a spring 42 anchored to wall 4*a* at 43** and secured to the right hand end of bar $D_3$ at 44. Spring 42 therefore tends to hold follower $D_2$ engaged with the periphery of cam D. Follower $D_2$ is moved vertically on wall 4a and is guided by a pair of spaced pins 45 extended into a slot 46 and slidably held by a retaining pin 47 (see FIGURE 4). Obviously, as bar $D_3$ oscillates on its axis 32 the clutches C and C' are alternately engaged and disengaged and motor M is shifted bodily for alternately engaging driving wheel 12 with adjacent surfaces of wheels 13 and 13' so as to reverse the direction of driving shaft 14 and the consequent reversal of reels 22 and 23 from recording to playing conditions. As viewed in FIGURE 2, the motor would be shifted from right to left and vice versa by suitable means operatively connecting the bar $D_3$ and motor base 9. This operation is effected by the engagement of the right hand end of bar $D_3$ as viewed in FIGURE 4 with the rounded pin 9a on motor base 9 (FIGURE 2) with the upper edge of bar $D_3$ as that end of said bar is raised, thereby forcing base 9 and motor M to the right as viewed in FIGURE 2 against the tension of a spring 48 anchored to bracket 8, the tension of spring 48 being sufficient to retract pin 9a when bar $D_3$ is reversely operated. Such operation engages driving wheel 12 with fly wheel 13 and when bar $D_3$ is retracted the motor and its base is shifted so that the driving pulley operatively engages wheel 13', thereby reversing the rotation of shaft 14 together with a corresponding reversal of the direction of tape movement. For example, if reel 22 were a pay-out reel and reel 23 a take-up reel, the rotational directions and character of said reels would be reversed together with the rotational direction of the drive shaft 14, if it were desired to reverse the direction of tape movement for recording and playing in the opposite direction. By means of this bi-directional action, it is possible to make virtually continuous sound recordings several times the length of the tape, by reversing the machine as it nears the end of one groove, shifting the tape guide 24 or 24' to the next adjacent position and continuing the recording in the opposite direction.

Cam D is coaxially fixed to a shaft 49 commonly with other cams E and F (FIGURE 5) and is manually operable by a knob $D_1$ in front of panel 4 on shaft 49 to which all of the cams D, E and F are fixed and with which said cams are simultaneously adjusted so that while cam D controls the adjustment of motor M, cam E will control the bodily swing of a combined recording and playing unit H bearing separate recording elements R and P and cam F controls and effects selective adjustment of the recording or playing stylus relative to roller 25.

In FIGURE 4 a follower arm 50 is shown hinged at 51 to the reverse side of wall 4a with its free end engageable with the periphery of cam E for varying the swing of arm 50 to correspond to the adjustment of head H through connection of pintle 51 with head H as shown in FIGURE 8. Pintle 51 is axially shiftable in panel 4 and wall 4a against tension of a spring 52' which is compressed between wall 4a and a pin or lug 53 on the pintle for the purpose of bodily adjusting head H into operative relationship with a sound track on tape T as indicated on and effected by knob $D_1$ and correspondingly adjusting follower arm 50 to operative engagement with cam E. Pintle 51 is adjusted axially by a set screw 54 borne by a bracket 61 as shown in FIGURE 8.

A magnetic recording head H is designed to cut or indent a laterally undulating groove or sound track in tape or other recording media. To its front end is attached a playing head P which is laterally restrained and vertically free, its lateral position being adjusted by means of the screw 81' bearing against shaft 82 which rides in bearings 80 and 80', said shaft being spring loaded against the adjustment screw 81' by means of leaf spring 83. Vertical restraint of head P is provided by screw 52 (FIGURE 4) which bears on plate 54 by which the amount of vertical movement of the playing head can be limited. By this means it is possible to so adjust the movement of playing head P that it will rest freely upon roller 25 when the head assembly is lowered into the play position, will remain in physical contact with the roller (or tape) when the recording head is also lowered into contact. Head P, however, will then be electrically disconnected from the circuit by appropriate switching on control shaft 49 (FIGURE 7) and head P will be raised out of contact with roller 25 when head H has been raised sufficiently for the adjusting screw 52 to bear on plate 54. Head H is adjustable on axial pintle 51 into recording and playing engagement with tape T under control of cam E having a major dwell $e$ concentric with shaft 49, similarly concave dwells $e_1$ and $e_2$ at the opposite extremities of dwell $e$, similar convex dwells $e_3$ and $e_4$ and a convex dwell $e_5$ between dwells $e_3$ and $e_4$, all of which dwells are transversed by an end 50a of arm 50 for regulating the swing of arm 50 and head H and the movement of the styli S and S' to and from recording and playing engagement with tape T, respectively. The downward thrust of follower arm 50 is retarded by a pneumatic cylinder 51' and a plunger 51a therein, said plunger having a stem 51b secured to arm 50 as shown in FIGURE 4.

Obviously, arm 50 cannot descend to an extent which would operatively engage stylus S or S' with tape T except when the end 50 of the arm seats in one of the valleys $e_1$ or $e_2$. Likewise, when control knob $D_1$ is appropriately turned to "stop" or non-recording or non-playing position, shaft 49 and cams D, E and F will be correspondingly rotated and a predetermined dwell $e$, $e_3$, $e_4$ or $e_5$ will be moved to a point under end 50a of arm 50 and thereby raise said arm, head H and the styli out of operative engagement.

Cam F is mounted on the rear side of panel 4 (FIGURE 7) on shaft 49 and is engageable by a follower arm 55 pivoted on an axis 56. Arm 55 has an end 57 adapted to traverse the periphery of cam F as shaft 49 is manually rotated by knob $D_1$ against tension of a spring 58 which is anchored at 59 to panel 4 and secured at 60 to arm 55.

Cam F has a major dwell $f$ concentric with shaft 49, valley dwells $f_1$ and $f_2$ and a minor convex dwell $f_3$ between dwells $f_1$ and $f_2$ (FIGURE 3). The major dwell $e$ of cam E and the dwell $f$ of cam F are at corresponding angles so that as shaft 49 is rotated both arms 50 and 55 wil be corespondingly swung upwardly. Pintle 51 of arm 50 is held in a bracket 61 between panel 4 and wall 4a as shown in FIGURES 2, 4 and 8.

In FIGURES 25 and 26 a section of roller 25 is shown with a portion of the tape T supported on its surface and the recording-playing area of the tape stretched in tension over the relief groove 88. An important element in providing the relief groove 88 is to provide for a slight displacement of the tape at the point of application of the stylus which is a medium less dense and resistant than the material comprising the roller 25.

In FIGURE 25 the recording stylus is shown in position on the tape, forming a sound groove by indenting the tape, which groove forms a slight raised edge 89 adjacent to the conical side of the stylus and protrudes on the reverse side of the tape due to the greater weight or pressure required for recording the original sound groove; the tape is substantially depressed into the relief groove 88 during recordation. When the substantially lighter playing head pressure is applied to the tape for reproducing the sound, the tape is not appreciably depressed into the relief groove 88 and as a result the recorded sound groove opens slightly with a consequently larger cross-sectional area or radius of curvature. For this reason the stylus used in the reproducing head will follow the sound groove more faithfully if it has a slightly larger tip-radius than the recording stylus. This condition is illustrated in FIGURE 26, in which the tape is shown in a substantially less depressed state, the groove is shown to be wider, and the playing stylus is of an appropriately larger radius so that it contacts and is guided by the sides of the sound groove.

By extending the tape around more than 180° of the roller 25, a curve is maintained in the tape acting as a stretched membrane which adds greatly to its rigidity and resistance to depression by the stylus.

Roller 25 is rotatably mounted on shaft 25*a* borne by follower arm 55 and shaft 25*a* which extend through a slot 26*a* in panel 4 so that under the influence of cam F said roller may be moved into engagement with and be driven by shaft 14 or out of engagement with shaft 14 at the will of an operator. When shaft 49 is turned by knob $D_1$, appropriately the major dwell *f* of cam F will engage the end 57 of arm 55 and raise roller 25 out of contact with driving shaft 14 regardless of the direction in which said shaft 49 is rotated. When end 57 of arm 55 has traversed the major concentric dwell *f*, it will then descend into engagement with one of the dwells $f_1$ or $f_2$ so that roller 25 will then drop into driving engagement with the shaft 14 and at such time as the mechanism is selectively set for either recording or reproduction. When, however, knob $D_1$ is turned so that end 57 of arm 55 engages the minor convex dwell $f_3$, the rotation of roller 25 will be stopped, at which position the entire mechanism including all of the units thereof is at rest. Through the action of arm 50 the combined recording and playing unit H is raised and lowered simultaneously with the movement of roller 25. That is to say, as roller 25 is disengaged from driving shaft 14, the mounting H for the recording head R and the playing head P is also raised and when the roller 25 is again lowered into driving relationship with shaft 14, the mounting H and heads R and P will be lowered corerspondingly to a different extent, depending upon which of said heads is to become operative.

The pneumatic delay 51′ functions to retard the rate of descent of the unit H so that in the event an operator wishes to advance the tape at a high rate of speed, the transition of the operation from playing to high speed forward (which passes through the recording cycle) will not allow the recording head to complete its descent into contact with the tape. Without such retardation the recording head would briefly mutilate, impair or erase a previously made sound track. Reels 22 and 23 are rotatably supported on flanges 22*a* and 23*a*, respectively, on their respective shafts 20 and 21 and are manually rotatable by knobs as at $C_4$ (FIGURES 1 and 2) at will.

FIGURES 19 and 20 show one type of playing head which is to be used for reproducing from either a conventionally recorded sound groove or a sound groove recorded by the displaced track system hereinafter described.

FIGURES 21, 22 and 23 illustrate an alternate form of the same general type of reproducing head shown in FIGURES 19 and 20 but designed for a different application as hereinafter described. This general type of reproducing head is essential to the successful operation of the machine for several reasons. No commercially available reproducing heads are capable of operation at extremely light needle pressure, nor do they have sufficiently lenient mechanical action to traverse the sound groove without deforming or destroying it. Moreover, conventional reproducing heads which have a reasonable degree of mechanical freedom or lenience have such a low power output as to require an unreasonable amount of amplification for use in the instant unit.

As a solution to the problems presented in reproducing the tape record made by this unit, I have devised and shown herein a reproducing head having the following benefits over other outmoded and current machines: extreme mechanical freedom; successful operation with very low pressure; wide frequency response and high power output. These results are achieved by means of the following structure: (FIGURES 19 and 20) plate 66 is coated with a thin insulating material and is electrically connected to ground. Plate 67 is similarly coated with a thin insulating varnish and is electrically connected to the amplifier A by means of a D.C. voltage fed to plate 67 whereby an electric potential is established in the gap between plates 66 and 67. Stylus S′ is resiliently mounted in block 69 which is made of a yieldable vibration-absorbing substance and is affixed to plate 67. Lateral displacement of stylus S′ while traversing the undulations of the sound groove varies the capacitance between plates 66 and 67, thereby varying the potential then being amplified by an amplifier and fed to a loudspeaker A, so as to effect audible reproduction of the signals recorded in the sound groove. Plate 67, upon approaching plate 66, increases the capacitance effect and in its movement away from plate 66 decreases the capacitance effect. The capacitance effect, a characteristic of this feature which has not previously been utilized, is the construction and arrangement of such reproducing unit so as to vary the volume level of its output when the oscillations of plate 67 occur in varying degrees of proximity to plate 66. Thus, the housing 70 of the reproducing head is restrained from lateral movement and the sound groove is displaced bodily relative thereto. If configuration of the sound groove is extended in either direction of theoretical median or center line disposed longitudinally of the record tape, the stylus will be correspondingly moved laterally as it traverses the groove, and plate 67 will then be moved closer to or farther from plate 66, depending upon the direction of displacement of the stylus by the devious variations from a straight longitudinal path. This displacement will then result in an increase or decrease of the signal level or power output. Displacement of the sound groove can be accomplished mechanically by shifting the tape during recording, but for the purpose of the present invention, it is more satisfactorily accomplished by electrical means as hereinafter described.

FIGURES 21, 22 and 23 illustrate another form of the capacitance playing head which is designed to be nonresponsive to groove displacement, volume-wise. This version of the playing head, while readily usable in the present tape recorder unit for the reproduction of sound grooves of the type shown at 71 and 72 of FIGURE 24, can also be used for highly satisfactory "dubbing" of conventional disc phonograph records onto the tape used in the present machine. For this use, a playing head of this type may be mounted in a simple, light-weight tone arm such as is used for playing disc records and connected to the capacitance pick-up channel of the tape recorder amplifier so that upon traversing the sound grooves of the disc record, it will transmit an accurate, distortion-free reproduction to the tape recorder for copying purposes.

Essential features of this version of the capacitance playing or pick-up head are as follows: metal plates 92 and 93 mounted in a housing P′ of FIGURE 23 are insulated from each other by a coating of insulating varnish, a soft yieldable damping substance 90 as shown in FIGURE 21. This may be plastisol and formed with a previously prepared block of the same substance 91 slightly softer. The block 91 may be molded into the substance 90 so as to provide a homogeneous mass with the block material physically softer than the surrounding material. In the block is a longitudinal hole for accepting the stylus S′. Mounting blocks 94 are of soft yieldable damping material for isolating the complete tone cell mechanically from its case so that in the playing of disc records, particularly those made of shellac or other relatively hard material, mechanical rumble will be held to a minimum.

A reproducing head of this type functions as follows: the thin metal plate 92 is affixed to the surface of the heavier plate 93 by cement and/or other suitable means with a slight air gap between plates 92 and 93. Since the capacitance effect is geometrically proportional to the spacing, there is an obvious advantage in having this air gap as small as possible to produce a maximum of signal output when traversing the sound groove. In the past, efforts have been made to achieve successful sound reproduction by some type of capacitance reproducer, but if the air gap between the stator and moving plates were large enough to prevent clashing when the stylus followed the maximum amplitude of the sound groove (a matter of .002" or so either side of center which required a gap of at least .005"), then the signal output was so feeble that great amplification was required with consequent high cost and tendency toward electronic troubles due to operation of amplifiers at excessive power levels. In the present form of the capacitance reproducer, this problem has been obviated. The air gap provided is in the order of .001" or less which results in 15 to 20 times the power output attainable with prior types of capacitance reproducers. Since this small air gap is not large enough to allow the moving plate to respond directly to the full excursion of the stylus in following the sound groove, it follows that some means for reducing the stylus excursion must be utilized. At first glance it may seen that the gains achieved by reducing the air gap might be offset by the deliberate mechanical loss of stylus amplitude, but since the volume gain is geometric while the mechanical loss is only linear, a very substantial gain can thus be effected.

Reduction in the effective action of the stylus is accomplished by forming the stylus somewhat as shown in FIGURE 21, so that it is free to pivot about the axis 22' as the stylus tip traces the undulations of the sound groove. If a stylus of this general form be frictionally mounted in a resilient block, such as certain high internal friction rubbers, or certain plastisols, and this block attached to the moving plate of a tone cell as shown in FIGURES 21–23, then the lateral movements of the stylus are not directly transferred to the moving plate so as to force it to move proportionally, but instead the resilient block acts to transmit a greatly reduced but accurately proportional amount of vibration from the vibrating stylus to the surface of the moving plate so that at maximum stylus excursion of .002" or .003" the moving plate of the tone cell makes an excursion of less than .0005". It is thus well within the space limitations of the small air gap but acting within a highly increased capacitance field produces a much greater signal output than is possible with reproducers previously known.

Also because of the stylus being mounted frictionally in the yieldable block, the relatively slow lateral displacement of conventional disc grooves due to the usual amount of eccentricity common to such recordings does not result in any volume variation, the stylus readily yielding to this slow periodic displacement without in any way affecting the audio-frequency responsiveness of the tone cell. In addition, the yieldable mounting of the stylus tends to damp out motor rumble which is commonly encountered in disc playing mechanisms and further provides a cushioning action to protect both record and reproducer in the event the reproducer is dropped onto the record surface.

When used in conjunction with the present tape recorder, this special version of the tape recorder reproducing head is thus capable of yielding more accurate and realistic copies of conventional records than is possible with previously known types of reproducer heads and greatly facilitates the valuable function of such a tape recorder in making satisfactory copies of existing records at approximately 1/100 the cost of the originals.

In further explanation of the structure and operation of the device of FIGURES 21, 22 and 23, attention is again called to the fact that although the stylus may move several thousandths of an inch, due to the damping effect of the flexible block in which the stylus is set, the vibrations of the stylus reach the tone cell in the form of greatly attenuated vibrations which move the flexible plate only a micrometric amount. Since this transmitted vibration is vastly reduced from the original excursions of the stylus tip, the minute air gap between the stator plate and the moving plate is never reduced to zero. Hence, despite their close facing, the plates never clash even at maximum excursion of the stylus. Attenuation of the stylus movement is a linear attenuation and the increase in tone cell output is a geometric function. Consequently, if the stylus motion transmission is reduced to one-fourth of its original value by way of example, and at the same time the working gap is reduced to one-fourth of its original value, three-fourths of the vibration is lost but there is a gain of sixteen times in output. In practice the gain is far more than the suggested computation because the micrometric gap can be made extremely narrow in the combination described. It should be understood that the output raises to a very high figure when the spacing is reduced to micrometric measurements.

FIGURE 24 illustrates an enlarged view of a short section of tape on which is recorded four distinct types of sound grooves 71, 72, 73 and 74.

Track 71 is a conventional sound groove recorded without modification of any kind.

Track 72 illustrates the same sound recorded under the influence of electronic "compression" by which means the dynamic range of the recorded sound is reduced in amplitude to avoid danger of distortion.

Track 73 illustrates the same sound recorded by means of the displaced track method in which sounds of less than a preferred median are recorded at one side of the theoretical longitudinal center line of the track. Sounds whose volume exceeds this arbitrary level are recorded on the other side of the groove center line with the result that in reproduction the playing stylus is displaced by following this recorded track and thus reproduces the sound at a greater or less level as previously noted. It is to be understood that the displacement of the track during recordation is relatively slow and gradual and in proportion to the initial sound volume. The displacement is accomplished by means of relative positioning electromagnetically of the recording stylus S and the tape during recordation, whether accomplished by a lateral shift of the stylus, the recording wheel or the tape guide or a combination thereof. In the example chosen it is the shift of the stylus which is resorted to. A displaced track such as is shown at 73 (FIGURE 24) is thus suitable for recording and reproducing sounds of extremely wide dynamic range which could not be successfully recorded and reproduced by a groove in any other known manner.

Track 74 illustrates an alternate version of the displaced track method in which the displacement is reversed. This, in effect, creates a compression condition and is suitable for special applications such as conference recording in which the conversation of individuals close to the microphone or at a great distance therefrom can be recorded at substantially the same reproducing level. Thus, the voice of a person who speaks softly or one who is at a great distance from the microphone will be recorded at an increased volume level and, conversely, the voice of a person who is close to the microphone or who speaks loudly will automatically be recorded with the sound groove displaced in the opposite direction. This sound may then be reproduced at a reduced volume level but in all cases with fidelity. In this manner, the proceedings of a large group can be recorded and reproduced at a substantially uniform volume level despite the fact that the actual original volume level may have been extremely wide.

The recording head R is best shown in FIGURES 13 to 17, inclusive, and is of magnetic type and includes a strong permanent magnet having pole pieces 64 and 64' secured together by a block 62 of magnetic material. Two coaxial coils 81 and $81_a$ have a common armature 82 for respectively regulating the pitch and volume of sound, as shown in exploded views in FIGURE 18. Armature 82 supports at its end the conical stylus S with a spherical tip 83′ (FIGURES 25 and 26). The armature 82 is reduced in section at 84 to provide flexibility. The armature 82 is mounted concentrically in the dual coils 81 and $81_a$ and is locked by the constriction of a split plate 63 of non-magnetic conducting material acting upon the split hub 85 of coils 81 and $81_a$. Coil 81 is energized by the amplifier and causes armature 82 to move laterally in the gap between the pole pieces 64, 64′. By this means the variations in the original sound are translated into lateral undulations of the sound groove on the tape T. Coil $81_a$, which is connected to the track-displacement section of amplifier A, operates to change the polarity of armature 82 so that it is attracted toward one side of the gap or the other during its oscillations and thus produces a sound groove which is laterally displaced in accordance with the impulses from said track-displacement section of amplifier A which is regulated or governed by the volume level of the original sound. Armature 82 is prevented from resonating independently of the actual sound signal by means of damping blocks 86 and $86_a$, and 87, of a soft, yieldable but non-resilient substance which acts to absorb any vibrations which are not initiated and sustained by the driving force of the electromagnetic system of the recording head.

The several electrical and electronic units are connected in a more or less conventional manner for accomplishing their usual functions in accordance with standard practice but are specifically arranged for adaptation to the particular features of the herein disclosed mechanism, as shown in FIGURE 27, and to such end the values specifically important to the proper functioning of the elements, respectively, and their interconnections are noted on the drawings or mentioned herein, or are readily understood by skilled technicians.

Alternating current is supplied to the system from a source through a pair of lead-in conductors 100 and 101 in one of which is a switch 102 and a fuse 103 in advance of a connection with the primary coil of a primary transformer 104 from which wires 105 and 106, respectively, lead to the motor M while the secondary coil of transformer 104 is suitably connected with the heating elements of a set of tubes X, $X_1$, $X_2$, $X_3$ and $X_4$ in a conventional manner. Tube X is a pentode amplifier for amplifying the signal from playing head P, the polarizing voltage of which is supplied through resistor 107 while a second resistor 108 and a condenser 109, when connected as shown, serve as a decoupling network to filter the polarizing voltage supply. A resistor 110 serves as a grid load for tube X and a condenser 111 serves as a coupling for tube X and a resistor 112 serves as a plate load for tube X when connected as shown. A resistor 113 in the circuit of tube X serves as a screen dropping element while a condenser 114 serves as a screen by-pass.

A high-mu triode or duodiode tube $X_5$ (which is shown with the diode elements omitted from the circuit) is in circuit with resistors 115 and 116 to respectively provide plate and grid loads for tube $X_5$ and a condenser 117 couples tube $X_5$ with tubes X and $X_5$, the output of which tubes is fed into a potentiometer (serving as a volume control) under control of switches 118 and 119 and the influence of a condenser 120 when connected as shown.

A pentode tube $X_1$ functions as a first audio-amplifier and a resistor 121 provides a plate load and a condenser 122 provides a coupling to tube $X_2$. A resistor 123 is a bias resistor and in conjunction with resistor 125 and a condenser 124 serve as an inverse feed back to the control circuit. Resistor 125 acts as a screen dropping resistor and a condenser 124 as a screen by-pass. Tube $X_2$ is a beam pentode output amplifier as received from transformer 104 (A.C.).

Resistors 108, 132, 133 and 134 together with condensers 109, 109′ comprise the filter system of the unit.

The speaker A is energized by plugging it into the circuit at 135, which circuit includes a secondary transformer 136.

A transformer 137 is in circuit with the recording head R through primary and secondary coil circuits 138 and 139 including coils 81 and $81_a$ and each including a pair of equalizing network units 140—141 and also a third coil 142 connected with a polarity changing switch 143 which in turn is connected with a transformer 144 having a switch 145 in its circuit. Each unit 140 includes a resistor 146 and a condenser 147 in series.

Certain conductors, as at 148, are shielded as indicated at 149 for obvious reasons and switches 150 are installed at points mentioned or shown for opening and closing the circuits of various elements of the system manually or automatically as may hereinafter appear if important to the operation of a unit.

A potentiometer 126 is a load resistor for tube $X_2$ and serves as a volume control for tube $X_3$ while a resistor 127 is a bias resistor and a condenser is a bias by-pass. Transformer 129 provides a coupling for the recording head R and speaker $A_1$ or both with tube $X_2$.

Tube $X_3$ serves as a driver for the displacement coil of recording head R and is coupled to the audio signal of a potentiometer 126 and the average audio signal is converted by means of transformer 130 and its interconnected rectifier tube $X_4$ to corresponding direct current votage which occasions a lateral sound track displacement from a median longitudinal line on tape T to an extent dependent upon the attenuation or variation of the volume.

Tube $X_4$ is a duodiode rectifier which rectifies the direct current voltage from a secondary transformer 131 for transmission to the plate circuits of all of the tubes X, $X_1$, $X_2$, $X_3$ and $X_4$.

In the form of device illustrated in FIGURES 32 and 33 the front panel 4 is shown as having guides 175 and 176 mounted thereon in spaced relationship and a tape roller 177 rotatably mounted upon the panel intermediate the guides in the same manner as described in connection with FIGURES 1, 2 and 11. In this instance, however, the tape roller may be provided with a smooth cylindrical surface 178 which need not be resilient nor of material of a soft consistency whereby to provide a cushion for a length of tape 179, where reproduction only is needed.

A sound head 180 is shown mounted upon an arm 181, the arm being positioned in a retainer 182 where it can be adjusted by sliding in one direction or the other and tightened in place by means of a screw 183. A counterweight 184 may be employed at the opposite end of the arm in order to balance the weight of the sound or reproducing head 180 so that it will rest very lightly on the tape 179.

A shaft 185 rotatably mounts the retainer 182 upon the panel, there being provided a washer 186 having a face 187 parallel to a face 188 of the panel and separated therefrom by a film of special oil 189. Liquid tension exerted by the film of oil is depended upon to hold the mounting very lightly against the panel with the pick-up assembly in accurate lateral alignment and at the same time to provide a yieldable damping effect so that the sound head will remain in the track even though the instrument might be disturbed.

Of special consequence is the location of a stylus 190 on the head so that it is brought into contact with the tape 179 immediately adjacent the point of departure 190 of the tape from the roller 177. By keeping the tape under tension, as is readily accomplished by the mechanism herein described, the stylus presses upon an unsupported length of the tape and hence during reproduction of the sound track of the tape, there exists no material which can influence the action of the stylus when vibrating and hence the playing back of the recording will be unproductive of extraneous sounds.

The form of tape guide illustrated in FIGURE 34 may be used successfully in the form of device above described. The guides are mounted upon the panel 4 at the same location as the guides 24 and 24' illustrated in FIGURE 5 and serve a comparable purpose. The tape guide of FIGURE 34 comprises a knurled knob 195 forming part of a guide body indicated generally by the reference character 196 which includes a shank 197 and tape-engaging surfaces 198 and 198'. Between the surfaces is a groove 199 which is spanned by a mid-portion 200 of the tape T. A screw 201 threadedly engages the shank 197, the screw being firmly anchored to the panel 4 by use of a washer 202 and riveted head 203. Grooves 204 in the shank serve the same purpose as the grooves in the guide posts described in connection with FIGURES 1 and 6. In the presently described embodiment it will be noted that the surfaces 198 and 198' are the surfaces of a frusto-conical form tilted toward an annular flange or guide surface 205. In this form of the device as tension is applied to the tape, the tape will tend to slide in the direction of the flange 205 and hence the flange serves to guide one edge only of the tape accurately during all stages of its operation. When the knob 195 is rotated to shift the tape guide axially in order to present a new portion of the tape to operation in connection with the stylus being used, the tape is readily moved by the flange in a direction from left to right. When the knob is rotated in a reverse direction causing the flange to move away from the tape, the sloping character of the surfaces 198 and 198' immediately causes the tape to slide into engagement again with the flange 205.

On those occasions where the tape supporting roller intermediate the guides may be only an idler roller and not employed directly to provide a friction drive, the form of device of FIGURE 35 may be found especially advantageous. As there shown a tape roller 210 is rotatably mounted upon the panel 4 by use of a shaft 211 which is secured by a riveted-over end 212 in accordance with substantially conventional practice. A washer 213 on the face of the panel is fixed to the shaft 211 and is provided with a flat surface 214 parallel to a flat surface 215 of a washer 216, the washer 216 being secured to the tape roller 210. Although a cap 217 is positioned on the shaft overlying the outer end of the tape roller, the cap is spaced therefrom and provides primarily a safety feature. To hold the tape roller in position a film 218 of oil is used. The oil is one preferably having a degree of viscosity and a character such that it provides a sufficient amount of liquid tension to retain the washers in substantial engagement, as illustrated in FIGURE 35, thereby to maintain the lateral position of the tape roller. The same film of oil also provides a lubricant for the mutually rotating surfaces 214 and 215.

In a modified form of a recording head illustrated in FIGURES 36, 37, 37*a*, and 38 a permanent magnet indicated generally by the reference character 220 having legs 221 and 222 and a connecting portion 223 is employed. On the legs are north and south poles 224 and 225, respectively, forming a space 226 therebetween. A yoke 227 has one leg 228 soldered to the leg 222 of the magnet and another leg 229 soldered to the magnet leg 221. The yoke is of non-magnetic material such as brass and includes a cap 230 at the top.

A stylus armature 231 has an enlarged upper end 232 soldered within the cap 230 and a lower end 233 located in the space 226 between the poles of the magnet. At the lowermost extremity is a stylus point 234 which is adapted to engage the medium on which a sound track is to be recorded. A relief 235 may be provided adjacent the upper end of the stylus in order to improve the ability of the stylus armature to flex.

A coil support indicated generally by the reference character 236 is here shown provided with an upper annular recess 237 and a lower annular recess 238. Extending through the center of the coil support is a bore 239 receptive of the mid-portion 240 of the stylus. A coil 241 of wire is wound within the upper recess 237 and a coil 242 of wire is wound in the recess 238. Customarily the coils are wound upon the coil support and the coil support thereafter slid over the stylus and cemented in place upon the stylus. The lower end of the stylus is damped by providing a damping block 243 attached at one end to the lower end 233 of the stylus and attached at the other end to the portion 223 of the magnet.

Assembled as thus described in connection with FIGURES 36 and 37, the recording head responds to electric impulses and acts in a manner similar to the recording head shown and described in connection with FIGURES 13 through 18, inclusive.

It will be appreciated that the device herein described is a microgroove device and hence that the point of the stylus will be relatively small and that the amplitude of vibration in a lateral direction will also be small. Further still, it is frequently desirable to have the medium upon which the sound track is to be impressed move relatively slowly, in which event the undulations of the track will be spaced relatively close together linearly. To permit the compacting of as many undulations as possible within a given linear distance a stylus point such as that illustrated in FIGURES 39 and 40 is advantageous. As there shown a stylus 250 is provided with a point 251 which in cross-sectional shape is over, as illustrated in section in FIGURE 40. It will be noted that the long axis of the eliptical shape is approximately twice as long as the short axis.

Shaped in this fashion as the stylus vibrates laterally in response to impulses supplied to it, a track 252 impressed upon the tape T may have the undulations relatively close together as illustrated in FIGURE 41 by reason of the fact that the short dimension of the stylus point can be exceptionally narrow without sacrificing needed strength in the point. Also since the radius of curvature at the lateral edges is relatively small, less resistance is offered by the material of the tape T to the lateral excursion. Moreover, by providing a stylus point which is relatively wide, though thin, the bearing area between the stylus point and the tape will be sufficiently great to enable the track to be impressed upon the tape without prospect of the stylus puncturing the ape.

There has accordingly been herein described a tape recorder of a self-contained type fitted for both recording and reproducing sound by means of a sound groove impressed on a very thin narrow tape, the groove being what is customarily termed a micro-groove. The recorder is built in such a way that a plurality of micro-grooves can be traced side by side on a single strip of tape by either recording and reproducing heads sufficiently sensitive to wide variations in both frequency and amplitude but arranged so that neither are beyond the ability of the tape to record and reproduce in multiple grooves. An instrument of great range has accordingly been disclosed which is at the same time very economical to build and to operate.

While the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described my invention, what I claim as new and desire to secure by Letters Patent is:

1. A tape conditioner comprising a recorder a support, a feed reel and a take-up reel rotatably mounted thereon and adapted to pass a tape therebetween, a tape contacting roller rotatably mounted on the support intermediate said reels having a surface over which said tape is adapted to pass, a tape conditioning head movably mounted on said support to positions adjacent and removed from the tape, said head having a portion having an operating position adjacent the tape productive of a track on said tape, a part of said roller less than the total width thereof comprising an annular area of said surface having less resistance to said portion than the remainder of said surface and located beneath said portion when said portion is in operating position, pressure means between the tape conditioning head and said portion, and an electric circuit connecting said portion with said recorder.

2. A tape conditioner comprising a recorder and reproducer, device a support, a feed reel and a take-up reel rotatably mounted thereon and adapted to pass a tape therebetween, a friction drive roller rotatably mounted on the support intermediate said reels having a friction drive surface over which said tape is adapted to pass, a tape conditioning head assembly movably mounted on said support to positions operatively adjacent and removed from the tape, said head assembly including recording and reproducing means, a recording element in the recording means having a recording stylus in sliding engagement with the tape and productive of a track on said tape, an annular portion of said surface having a charcter less resistant to said recording stylus than the remainder of said surface, a reproducing element having a reproducing stylus different from the recording stylus and having a track following position, pressure means between the tape conditioning head assembly and the styli, and an electric circuit connecting said styli alternatively with said recorder and reproducer device.

3. A tape recorder comprising a recording and reproducing device, a support, a feed reel and a take-up reel rotatably mounted thereon and adapted to pass a tape therebetween for carrying a sound track impression, a friction drive sound roller rotatably mounted on the support intermediate said reels and having a resilient circumferential surface over which said tape is adapted to pass, laterally adjustable guide posts mounted on the support on opposite sides of the sound roller and parallel thereto with annular tape edge containing means thereon for one edge only of the tape, a sound head assembly movably mounted on the support to positions adjacent and away from the tape, said sound head including recording and reproducing means, a recording stylus in the recording means on said sound head assembly having a rounded point in sliding engagement with the tape and productive of a laterally displaced sound track on the tape in response to an alternating electric sound source responsive to the volume of sound, a reproducing stylus having a rounded point having a track following position and responsive in lateral displacement to sound intensity variations affecting the lateral position of said track as a whole, pressure means between the sound head assembly and said styli and an electric circuit connecting said styli alternatively with said recording and reproducing device.

4. A tape recorder comprising a recording and reproducing device, a support, a feed reel and a take-up reel rotatably mounted thereon and adapted to pass a tape therebetween for carrying a sound track impression, a friction drive sound roller rotatably mounted on the support intermediate said reels and having a resilient circumferential surface over which said tape is adapted to pass, a sound head assembly movably mounted on the support to positions against and away from the tape, said sound head assembly including recording and reproducing means, a recording stylus in the recording means on said sound head assembly having a rounded point in engagement with the tape under one pressure condition and productive of a laterally displaced sound track on the tape in response to an alternating electric sound source responsive to the volume of sound, a reproducing stylus having a rounded point of greater radius than the point of the first stylus having a track following position and in engagement with the track under another pressure condition, said reproducing stylus being responsive in lateral displacement to sound intensity variations affecting the lateral position of said track as a whole, pressure means between the sound head assembly and said styli and an electric circuit connecting said styli alternatively with said recording and reproducing device.

5. A tape recorder comprising a support, a feed reel and a take-up reel rotatably mounted thereon and adapted to pass a tape therebetween for carrying a sound track impression, a friction drive sound roller rotatably mounted on the support intermediate said reels and having a resilient circumferential surface with an annular relief groove therein over which said tape is adapted to pass, laterally adjustable guide posts mounted on the support on opposite sides of the sound roller and parallel thereto with annular tape edge containing means thereon for one edge only of the tape, a sound head assembly tiltably mounted on the support and movable to positions adjacent and away from the tape, said sound head assembly including recording and reproducing means, a recording stylus in the recording means on said sound head assembly and having a point slidably engageable with the tape and productive of a laterally displaced sound track on the tape in response to an alternating electric sound source and responsive in lateral displacement to sound intensity impulses, a reproducing stylus in the reproducing means of the sound head assembly and having a point of greater radius than the point of the first stylus and having a track following position in the track and responsive in lateral vibrational movement to sound frequency variations in the sound track and responsive in lateral displacement to sound intensity variations relative to the lateral position of said track as a whole, and resilient pressure means between the sound head and said styli productive of pressure on the recording stylus greater than pressure on the reproducing stylus, and an electric circuit connecting said reproducing means alternatively with said recording means.

6. A tape recorder comprising a support, a feed reel and a take-up reel rotatably mounted thereon and adapted to pass a tape therebetween for carrying a sound track impression, a friction drive sound roller rotatably mounted on the support intermediate said reels and having a resilient circumferential surface with an annular relief groove therein over which said tape is adapted to pass, laterally adjustable guide posts mounted on the support on opposite sides of the sound roller and parallel thereto with annular tape edge containing means thereon for one edge only of the tape, a sound head assembly mounted on the support to positions adjacent and away from the tape, said sound head assembly including recording and reproducing means, a recording stylus in the recording means on said sound head assembly hava point in sliding engagement with the tape and productive of a laterally displaced sound track on the tape in response to an alternating electric sound source, a reproducing stylus in the reproducing means of the sound head assembly having a point of greater radius than the point of the first stylus, said reproducing stylus having a track following position and responsive in lateral vibrational movement to sound frequency variations in the sound track, resilient pressure means between the sound head assembly and said styli and an electric circuit connecting said reproducing means alternatively with said recording means.

7. A tape recorder comprising a support, a feed reel and a take-up reel rotatably mounted thereon and adapted to pass a tape therebetween for carrying a sound track impression, a friction drive sound roller rotatably mounted on the support intermediate said reels and having a resilient circumferential surface over which said tape is adapted to pass, laterally adjustable guide posts mounted on the support on opposite sides of the sound roller and parallel thereto with annular tape edge containing means thereon for one edge only of the tape, a sound head assembly movably mounted on the support to positions adjacent and away from the tape, a sound head assembly including recording and reproducing means, a recording stylus in the recording means on said sound head assembly having a rounded point in slidable engagement with the tape and productive of a laterally displaced sound track on the tape in response to an alternating electric sound source responsive to the volume of sound, a reproducing stylus on the sound head assembly having a rounded point of greater radius than the point of the first stylus having a track following position and responsive in lateral displacement to sound intensity variations affecting the lateral position of said track as a whole, pressure means between the sound head assembly and said styli and an electric circuit connecting said styli alternatively with said tape recorder.

8. In a sound tape device, a relatively heavy electrically conducting plate and means forming an electric circuit through the plate, a relatively light electrically conducting plate in face to face position with the heavy plate and resiliently mounted at one edge thereof to a corresponding edge of the heavy plate so that one of said plates extends obliquely outwardly from the other providing a substantially wedge-shaped air gap and in physical contact therewith and electrically insulated therefrom, movement of the plates relative to each other being productive of a variation in the air gap and in the capacitance effect which occurs first and to a greater degree at said one edge and spreads to a greater extent as the amount of flexure increases and which results in varying flow of current, and a sound track stylus secured to a free end of one of said capacitance plates.

9. In a sound tape device, the combination of a tape and means supporting said tape during travel thereof in a position fixed against lateral movement during an operating cycle, a sound head for the tape comprising the tape housing mounted over said head being held against lateral movement relative to the tape position, a relatively heavy electrically conducting plate in the housing and means forming an electric circuit through the plate, a relatively light electrically conducting plate in face to face position with the heavy plate and resiliently mounted at one edge only thereof to a corresponding edge of the heavy plate so that the light plate extends outwardly therefrom and in physical contact therewith and electrically insulated therefrom, movement of the plates relative to each other being productive of a variation in the capacitance effect which results in varying flow of current, and a sound track stylus secured to a free end of one of said capacitance plates, said stylus extending outwardly of said housing and having a point at the outer end in a sound track following position on the tape, lateral displacement of the track on the tape from a central axis being productive of a variation in the relative distance between said plates dependent upon the lateral displacement of the track whereby the volume level of sound is varied.

10. In a tape recorder and reproducer comprising a support, a feed reel and a take-up reel on the support for transporting a strip of recording tape from one reel to the other, means holding the tape in a fixed linear path during recording and reproducing cycles of a selected length of said tape, the combination of a sound head for the tape between said reels comprising a housing mounted over the tape and secured against lateral movement relative to the tape; a laterally undulating track on said tape displaced laterally relative to a central axis, a relatively heavy electrically conducting plate in the housing and means forming an electric circuit through the plate, a relatively light electrically conducting plate in face to face position with the heavy plate and resiliently mounted at one edge thereof to a corresponding edge of the heavy plate so that the light plate extends obliquely outwardly from the heavy plate and in physical contact therewith and electrically insulated therefrom, an electric recording and reproducing circuit connected to said plates whereby movement of the plates relative to each other varies the capacitance effect which results in a varying flow of current, and a sound track stylus secured to a free end of said light plate and extending outwardly of said housing, a point on said stylus engageable with the tape, said stylus and said light plate having a sound track following location productive of lateral displacement of only the light plate from a central axis to any amount determined by said lateral displacement and said variation in the relative distance between said plates whereby the volume level of reproduced sound is varied.

11. In a tape recorder the combination of an electronic recording system including a volume responsive amplifier, a recording head comprising a casing, elements on said casing comprising magnetic north and south poles and having a gap therebetween, a non-magnetic armature support on the side of the casing opposite the gap, an elongated recording armature on said armature support extending through the gap and beyond the casing to recording position, and a pole changing electric coil on the main support coaxial with the armature electrically connected to said volume responsive amplifier responsive to changes in the direction of electric current whereby to vary the electric amplifier impulses which are regulated by the volume of the original sound source.

12. In a tape recorder and reproducer comprising a main support, a tape, a feed reel and a take-up reel for the tape on the main support, a positioner for the tape on the main support determinative of the lateral position of the tape during a selected cycle, the combination of a recording head comprising a casing on the support mounted in a line of travel of the tape between said reels, a positioner for the recording head determinative of the lateral position of the head relative to the lateral position of the tape during said cycle, side walls of said casing comprising magnetic north and south poles and having a gap therebetween at one side of the casing, a non-magnetic armature support on the side of the casing opposite the gap, an elongated recording armature on said armature support extending through the gap and beyond the casing and a track follower on the armature in a recording position relative to the tape, and a pole changing electric coil on the main support coaxial with the armature responsive to varying electric amplifier impulses which are regulated by the volume of the original sound source excited volume changes, a laterally undulating track on said tape having a varying lateral displacement relative to a liner center line, said follower having a position with respect to the north and south poles dependent upon to direction and amount of displacement of the track relative to the linear center line.

13. In a tape recorder and reproducer comprising a main support, a feed reel on the main support and a take-up reel on the main support, and a tape on said reels extending in a line of travel therebetween, a laterally undulating track on said tape having a varying lateral displacement relative to a linear center line, the combination of a recording head comprising a casing on the main support mounted in the line of travel of tape, side walls of said casing comprising magnetic north and south poles, and having a gap therebetween at one side of the casing, a non-magnetic armature support on the side of the casing opposite the gap, an elongated recording armature device on said armature support extending through the gap and beyond the casing and a track follower on the armature device positioned in the track and having a recording position dependent upon the lateral displacement of the track, a roller for the tape including a device mounting the roller on said main support, a pole changing electric coil on the main support operably associated with one of said devices and responsive to varying electric amplifier impulses which are regulated by the volume of the original sound source excited volume changes whereby to shift the position of the tape laterally relative to the position of the stylus in response to said volume changes.

14. In a tape recorder and reproducer comprising a main support, a feed reel on the support, a take-up reel on the support and a tape on said reels passing in a line of travel therebetween, the combination of a recording head comprising a casing on the main support mounted in the line of travel of the tape between said reels, side walls of said casing comprising magnetic north and south poles and having a gap therebetween at one side of the casing, a non-magnetic armature support on the side of the casing opposite the gap, an elongated recording armature on said armature support extending through the gap and beyond the casing to recording position relative to the tape, a frequency responsive electric coil on said main support coaxial with said armature, and a pole changing electric coil on the main support coaxial with the first coil and the armature responsive to varying electric amplifier impulses which are regulated by the volume of the original sound source.

15. In a tape recorder and reproducer comprising a main support, a feed reel on the main support, a take-up reel on the main support and a tape on said reels passing in a line of travel therebetween, the combination of a recording head comprising a casing on the main support mounted in the line of travel of the tape between said reels, side walls of said casing comprising magnetic north and south poles and a gap therebetween at one side of the casing, a non-magnetic armature support on the side of the casing opposite the gap, an elongated recording armature on said armature support extending through the gap and beyond the casing to recording position relative to the tape, a frequency responsive electric coil on said main support coaxial with said armature, a pole changing electric coil on the main support coaxial with the first coil and the armature responsive to varying electric amplifier impulses which are regulated by the volume of the original sound source, and vibration dampers between the armature and the casing adapted to absorb substantially all vibrations in the casing other than electrically produced vibrations.

16. In a tape recorder having a main support, a feed reel on said main support, a take-up reel on said main support and a tape on said reels extending therebetween, the combination of a recording and playing head mounted on the main support and a relatively large friction drive roller for the tape rotatably mounted upon the main support intermediate said reels and having a resilient cylindrical exterior circumferential surface, said recording and playing head being adjacent the drive roller and including a sound stylus, a driven shaft in frictional engagement with the exterior circumferential surface of the drive roller, at least one tape guide post on the support adjacent the drive roller whereby said tape is confined against the drive roller, said resilient exterior circumferential surface having a circumferentially extending relief groove having a bottom extended to a depth such that the tape remains clear of the bottom under pressure of said stylus.

17. In a tape recorder having a main support, a feed reel on said main support, a take-up reel on said main support and a tape on said reels extending therebetween, the combination of a recording and playing head mounted on the main support and a relatively large friction drive roller for the tape rotatably mounted upon the main support intermediate said reels and having a resilient cylindrical exterior circumferential surface, said recording and playing head being adjacent the drive roller and including a sound stylus, a driven shaft in frictional engagement with the exterior circumferential surface of the drive roller, a pair of tape guide posts on the support adjacent the drive roller and on opposite sides of and adjacent said driven roller whereby said tape is confined against the drive roller, said guide posts having circumferential tape receiving grooves therein, said resilient exterior circumferential surface having a circumferentially extending relief groove having a bottom extended to a depth such that the tape remains clear of the bottom under pressure of said stylus.

18. In a tape recorder comprising a main support, a feed reel and a take-up reel rotatably mounted on a support, and a tape passing therebetween, the combination of a friction drive roller of relatively great circumference for the tape rotatably mounted upon the support intermediate said reels and having a resilient cylindrical exterior circumferential surface, and a playing head adjacent the drive roller comprising recording and reproducing means, a driven shaft rotatably mounted on the support in frictional engagement with the exterior circumferential surface of the drive roller, a pair of idler tape guiding posts mounted on the support adjacent the drive roller and on opposite sides of and adjacent said driven roller whereby said tape is confined against the drive roller, said idler posts having circumferential tape receiving grooves therein, said resilient exterior circumferential surface of the drive roller having a circumferentially extending relief groove and a bottom for the groove at a depth such that the tape remains clear of the bottom under pressure of both said recording stylus and said reproducing stylus, said reproducing stylus and said recording stylus having a resilient pressure means directed to exert a lesser pressure between the reproducing stylus and said tape than between the recording stylus and the tape.

19. In a tape recorder comprising a support, a feed reel and a take-up reel mounted on a support, and a tape extending between said reels, the combination of a relatively large friction drive roller for the tape rotatably mounted upon the support intermediate said reels and having a resilient cylindrical exterior surface, and a sound head adjacent the driven roller including a sound stylus, a driven shaft rotatably mounted on the support and in frictional engagement with the exterior surface of the drive roller, a pair of tape guide posts on the support adjacent the drive roller and on opposite sides of and adjacent said driven roller, said guide posts being spaced from each other a distance less than the diameter of the friction drive roller whereby the tape is stretched over the surface of the drive roller throughout a portion thereof in excess of 180°, said guide posts having tape receiving grooves therein, said resilient exterior surface having a circumferentially extending relief groove and a bottom for the groove extending to a depth such that the tape remains clear of the bottom when depressed under pressure of the stylus.

20. In a tape recorder and reproducer comprising a support, a feed reel and a take-up reel on the support for carrying a roll of recording tape, and a sound head between the reels having a sound track follower in a preset position adapted to follow the tape as it passes said head, the combination of a tape guide mounted on the support respectively between one of said reels and the sound head, said guide comprising a tape edge engaging element, a finger hold on the guide adapted to facilitate shifting of said guide laterally relative to the sound head roller, said guide when shifted being operative to advance the tape edge engaging element against one edge only of the tape and to shift said tape laterally to different settings to the follower.

21. In a tape recorder and reproducer comprising a suport, a feed reel and a take-up reel on the support, a roll of recording tape carried by said reels, and a sound head between the reels having a sound track follower in a preset position adapted to follow the tape as it passes said head, the combination of a forward tape guide and a reverse tape guide mounted on the support respectively between the feed reel and the sound head and between the take-up reel and the sound head, each said guide comprising a threaded shaft on the support and a substantially cylindrical post threadedly engaging the shaft, each said post having an annular edge element adapted to engage one edge of the tape, a finger-hold on each post adapted to facilitate rotation of said post and being operative to advance the edge element against said one edge only of the tape and to shift said tape laterally to different settings relative to the follower, each said post having a plurality of circumferentially spaced stops thereon corresponding each to a separate settings of the post and a resilient detent adapted to engage the stops one at a time and being determinative of a desired setting of the post and the tape.

22. In a tape recorder and reproducer comprising a support, a feed reel and a take-up reel on the supoprt for carrying a roll of recording tape, and a sound head between the reels having a sound track follower in a preset position adapted to follow the tape as it passes said head, the combination of a relatively forward tape guide and a relatively reverse tape guide mounted on the support respectively between the feed reel and the sound head and between the take-up reel and the sound head, each said guide comprising a threaded post threadedly attached to the support, each said post having a circumferential groove of rectangular cross section wider than the width of the tape, a finger-hold on each post adapted to facilitate rotation of said post whereby to threadedly advance the post against one edge only of the tape and to shift said tape laterally to different settings relative to the follower, each said post having a plurality of circumferentially spaced stops thereon corresponding each to a separate setting of the post and a resilient detent adapted to engage the stops one at a time whereby to determine a desired setting of the post and the tape.

23. In a tape recorder a feed reel and a take-up reel rotatably mounted thereon, and a relatively thin narrow tape on said reels and extending therebetween, the combination of a recording and playing head comprising a relatively large friction drive roller for the tape rotatably mounted upon the recorder intermediate said reels and having a resilient cylindrical exterior circumference greater in width than the width of the tape, and a sound head adjacent the driven roller, a driven shaft in frictional engagement with the exterior circumference of the drive roller, a pair of tape guiding posts on the recorder adjacent the drive roller and on opposite sides of and adjacent said driven roller whereby said tape is confined against the drive roller, and at least one tape guide arm located between one of the reels and the guiding post adjacent thereto, said guide arm having a tape contacting slideway along which the tape passes in a condition rotated from the position of the tape on the adjacent guiding post.

24. In a tape recorder a thin relatively narrow tape, a feed reel and a take-up reel for said tape rotatably mounted on said recorder, a recording and playing head and a relatively large friction drive roller for the tape rotatably mounted upon the recorder intermediate said reels and having a resilient cylindrical exterior surface, and a sound head adjacent the drive roller including recording and reproducing styli, a driven shaft in frictional engagement with the exterior surface of the drive roller, a pair of tape guiding posts on the recorder adjacent the drive roller and on opposite sides of and adjacent said driven roller whereby said tape is confined against the drive roller, said guiding posts having circumferential tape receiving grooves therein, tape guide arms located one between the feed reel and the guiding post adjacent thereto and another located between the take-up reel and the other guiding post, each tape guide arm having a slot through which the tape passes rotated substantially 90° from the position of the tape on the respective guide post.

25. In a sound recorder an electrically conducting relatively heavy plate and means forming an electric circuit through said plate, an electrically conducting relatively light plate in face to face position with said heavy plate and with a space therebetween of a magnitude of less than .001 inches, an attachment securing sides of said light plate substantially in fixed relationship to said heavy plate, a sound track stylus and a damping means securing the stylus to the light plate at a location opposite said space and in spaced relation to said light plate, whereby vibration at the stylus point is productive of a proportionately lesser vibration in said stylus, said lesser vibration being productive of a variation in the capacitance effect which results in a varying flow of current in said light plate.

26. A sound reproducing head comprising a housing, a relatively heavy metal plate having an insulating exterior mounted in vibration isolated position on one inner wall of the housing and in spaced relation thereto, a relatively light metal plate having an insulating exterior affixed face to face to the heavy metal plate at a slight distance therefrom and within a distance productive of an operable capacitance effect in said plates, electric connections respectively to said plates adapted to be connected to an electric sound reproducing system, a soft yieldable damping substance superimposed over the surface of said light metal plate on the side opposite the heavy metal plate, a centrally disposed block of slightly resilient material in said damping substance, a reproducing stylus having a relatively straight shank thereof mounted in said blocks and a pointed sound track following end on the stylus extending angularly outwardly from one end of the shank to a location outside said housing.

27. A tape transport mechanism comprising a main support, a feed reel on said main support, a take-up reel on said main support, and a tape conditioning roller for the tape rotatably mounted on the main support intermediate said reels having an annular exterior tape contacting surface, a guide between said feed reel and said drive roller, said guide having a tape-receiving surface and a tape guide flange at one edge of said tape-receiving surface and means normally urging said tape in a direction wherein one edge only thereof is adapted to travel in engagement laterally against said flange whereby to guide the tape relative to said tape-receiving surface, said flange having a range of movement toward and away from said tape and being shiftable throughout said range whereby to shift the position of the tape on said tape conditioning roller.

28. A tape transport mechanism comprising a main support, a feed reel on said main support, a take-up reel on said main support, and a tape conditioning roller for the tape rotatably mounted on the main support intermediate said reels having an annular exterior tape contacting surface, a tape guide roller between said feed reel and said drive roller, said guide roller having a tape-receiving surface and an annular tape guide flange at one edge only of said tape receiving surface, said tape-receiving surface being tilted radially inwardly in a direction toward said tape guide flange whereby tape on said tape receiving surface is urged in a direction wherein one edge only thereof is adapted to travel in guided relationship with said flange, said flange having a range of movement toward and away from said tape and being shiftable throughout said range whereby to shift the position of the tape on said tape conditioning roller.

29. A tape recorder comprising a support, a feed reel and a take-up reel on said support adapted to have a tape extend therebetween, an idler shaft, a friction roller on said shaft for the tape rotatably mounting said roller on the support intermediate said reels, said roller having a tape engaging exterior circumference, a tape conditioning head adjacent the roller, an idler guide disc on the support having a surface thereof facing said roller, a cap on said idler shaft adjacent and spaced from said roller, a surface on the side of said roller opposite said cap and a liquid film betwen the surfaces respectively on said roller and said idler guide disc adapted to lightly retain said roller in a position adjacent said idler guide disc.

30. In a sound recorder the combination of a recording head comprising a permanent horseshoe magnet, north and south poles on said magnet forming a space therebetween, a non-magnetic yoke secured to the magnet, an elongated recording armature having one end secured to said yoke and the other end located in said space, a stylus on said other end, a damping block securing said other end to said magnet, a positioning coil and a recording coil secured in axial relationship side by side on the armature intermediate said ends, said coils being physically movable with the armature, at least one of said coils being responsive to varying electrical amplifier impulses which are regulated by volume of the original sound source excited volume changes.

31. In a sound recorder the combination of a recording head comprising a permanent horseshoe magnet having legs and a connecting portion therefor, north and south poles on said legs forming a space therebetween, a coil support having a bore therethrough a non-magnetic yoke having side portions secured respectively to said legs of the magnet, an elongated recording armature having one end secured to said yoke and the other end located in said space, a recording stylus on said other end, a damping block securing said other end of the stylus to said connecting portion of the magnet, a positioning coil and a recording coil secured in axial relationship side by side on the armature intermediate said ends and being movable physically with said armature, at least one of said coils being responsive to varying electrical amplifier impulses which are regulated by volume of the original sound source excited volume changes.

32. In a microgroove impression tape recorder having a main support, a feed reel and a take-up reel mounted on said main support in spaced relation, a roller having an annular surface and rotatably mounted on said main support intermediate said reels for carrying tape between said reels, means forming an annular groove in the surface of the roller at a location intermediate opposite sides, a sound head mounted on the main support adjacent said roller and a sound stylus in said head having a tape-engaging end adapted to engage said tape, said tape-engaging end being rounded at the outer extremity and having a width in a direction transverse to a line of travel of the tape at least twice the breadth in a direction coinciding with said line of travel whereby to enable use of tracks on the tape in laterally close association.

33. A tape conditioner comprising a support, a pair of tape guides mounted on said support in spaced relation, a roller having a relatively flat tape contacting surface and rotatably mounted on said support intermediate said tape guides and adapted to have tape to be impressed pass thereover from said contacting surface to at least one of said guides, a tape conditioning head, a supporting arm for said head mounting said head on the support at a location above the tape and adjacent a point of departure of the tape from said roller, a tape conditioner element on said head movable into pressure engagement with the tape on said unsupported portion of said tape adjacent said point of departure.

34. A method of employing styli having working ends of different breadth for impressing a laterally indulating track on very thin tape and faithfully reproducing said undulations thereon comprising supporting said tape on opposite sides and leaving a relatively unsupported path therebetween where said track will be impressed, impressing said undulations in the tape to form a track thereon with a stylus having a relatively sharp tape contacting end, employing a relatively great amount of pressure against the stylus and the tape whereby the tape is depressed and transversely stretched by the stylus during impression of the track, passing said tape through a reproducing cycle and providing linear tension in the tape during said reproducing cycle and flattening the tape in a transverse direction to a degree greater than during recording whereby to relieve the transverse stretch in the tape and expanding the breadth of the track, and passing a stylus having a relatively wide contacting end of a greater radius of curvature than the expanded breadth of the track and under a relatively lesser amount of pressure than used on the recording stylus whereby to keep the reproducing stylus at all times in engagement with both sides of the track and free of the bottom of the track and faithfully reproduce all portions of the lateral undulations of the track.

35. In a sound recording and reproducing device, the combination of a sound track carrier and means supporting said carrier during travel thereof in position wherein a track on the carrier is fixed against lateral movement during an operating cycle a sound head for the carrier comprising a housing over the carrier, said head being held against lateral movement relative to the carrier position, a relatively heavy electrically conducting plate in the housing and means forming an electric circuit through the plate, a relatively light electrically conducting plate in face to face position with the heavy plate and resiliently mounted at one edge only thereof to a corresponding edge of the heavy plate so that the light plate extends outwardly therefrom and in physical contact therewith and electrically insulated therefrom, movement of the plates relative to each other being productive of a variation in the capacitance effect which results in varying flow of current, and a sound track stylus secured to a free end of one of said capacitance plates, said stylus extending outwardly of said housing and having a point at the outer end in a sound track following position on the carrier, lateral displacement of the track on the carrier from a central axis of the track being productive of a variation in the relative distance between said plates dependent upon the lateral displacement of the track whereby the volume level of sound is varied.

References Cited in the file of this patent

UNITED STATES PATENTS

| | | |
|---|---|---|
| 1,728,278 | Miessner | Sept. 17, 1929 |
| 1,794,915 | Mittell | Mar. 3, 1931 |
| 2,087,135 | Wielage | July 13, 1937 |
| 2,096,106 | Guerbilsky | Oct. 19, 1937 |
| 2,258,596 | Cortella | Oct. 14, 1941 |
| 2,351,005 | Camras | June 13, 1944 |
| 2,382,161 | Kuhlik | Aug. 14, 1945 |
| 2,415,681 | Faus | Feb. 11, 1947 |
| 2,542,590 | Stone | Feb. 20, 1951 |

FOREIGN PATENTS

| | | |
|---|---|---|
| 310,762 | Great Britain | Apr. 30, 1929 |